US012170707B1

(12) United States Patent
Cowan et al.

(10) Patent No.: US 12,170,707 B1
(45) Date of Patent: *Dec. 17, 2024

(54) MULTI-ACCESS EDGE COMPUTING FOR TRAFFIC MANAGEMENT

(71) Applicant: EDJX, INC., Raleigh, NC (US)

(72) Inventors: John Cowan, Raleigh, NC (US);
Robert Paul Bullock, St Helier (JE);
James A. Thomason, Las Vegas, NV (US)

(73) Assignee: EDJX, INC., Raleigh, NC (US)

( * ) Notice: Subject to any disclaimer, the term of this patent is extended or adjusted under 35 U.S.C. 154(b) by 113 days.

This patent is subject to a terminal disclaimer.

(21) Appl. No.: 17/695,424

(22) Filed: Mar. 15, 2022

Related U.S. Application Data

(63) Continuation-in-part of application No. 17/307,676, filed on May 4, 2021, and a continuation-in-part of application No. 17/307,698, filed on May 4, 2021, said application No. 17/307,676 is a continuation-in-part of application No. 17/226,716,
(Continued)

(51) Int. Cl.
*H04L 67/1021* (2022.01)
*G06F 16/245* (2019.01)
*H04L 67/01* (2022.01)
*H04L 67/02* (2022.01)
*H04L 67/101* (2022.01)

(52) U.S. Cl.
CPC ........ *H04L 67/1021* (2013.01); *G06F 16/245* (2019.01); *H04L 67/01* (2022.05); *H04L 67/02* (2013.01); *H04L 67/101* (2013.01)

(58) Field of Classification Search
None
See application file for complete search history.

(56) References Cited

U.S. PATENT DOCUMENTS 6,661,799 B1 * 12/2003 Molitor ............... H04L 61/2575
370/466
6,829,654 B1 * 12/2004 Jungck ................ H04L 47/10
709/218

(Continued)

FOREIGN PATENT DOCUMENTS

CN  111226429 A    6/2020
KR  101823293 B1 *  1/2018
(Continued)

*Primary Examiner* — Lance Leonard Barry
(74) *Attorney, Agent, or Firm* — NEO IP

(57) ABSTRACT

Systems for providing multi-access edge computing and content delivery. At least one cloud platform in network communication with at least one edge and at least one server node are provided. The at least one cloud platform includes a domain name system (DNS) service, an edge DNS service, at least one cloud platform application programming interface (API), at least one router, a cloud platform database, and a node database. The at least one cloud platform is operable to receive a Hypertext Transfer Protocol (HTTP) request from the at least one edge device. The at least one server node is operable to create at least one network and deliver network services to the at least one edge device. The at least one server node is registered in a cloud platform global registry, associated with the at least one cloud platform, using an HTTP POST request to a global service address.

10 Claims, 8 Drawing Sheets

Related U.S. Application Data filed on Apr. 9, 2021, now Pat. No. 11,528,323, said application No. 17/307,698 is a continuation-in-part of application No. 17/226,716, filed on Apr. 9, 2021, now Pat. No. 11,528,323, which is a continuation of application No. 16/831,069, filed on Mar. 26, 2020, now Pat. No. 10,986,173.

(60) Provisional application No. 63/090,265, filed on Oct. 11, 2020, provisional application No. 62/838,733, filed on Apr. 25, 2019.

(56) References Cited

U.S. PATENT DOCUMENTS

| | | | |
|---|---|---|---|
| 7,032,031 B2* | 4/2006 | Jungck | H04L 47/19 709/246 |
| 8,392,912 B2* | 3/2013 | Davis | H04L 67/02 717/172 |
| 8,539,079 B2* | 9/2013 | Thireault | H04L 41/0806 709/219 |
| 8,694,610 B2* | 4/2014 | Jungck | H04L 67/1001 709/219 |
| 9,104,326 B2 | 8/2015 | Frank et al. | |
| 9,391,856 B2* | 7/2016 | Kazerani | H04L 41/5067 |
| 9,444,858 B1 | 9/2016 | Boyle et al. | |
| 9,685,077 B2 | 6/2017 | Schlienz et al. | |
| 9,713,000 B2* | 7/2017 | Oertle | H04W 8/245 |
| 9,787,560 B2* | 10/2017 | Maddux | H04L 43/08 |
| 9,880,756 B2 | 1/2018 | Mutalik et al. | |
| 9,904,603 B2 | 2/2018 | Mutalik et al. | |
| 10,122,547 B2 | 11/2018 | Mahindra et al. | |
| 10,334,446 B2 | 6/2019 | Ashrafi | |
| 10,341,868 B2 | 7/2019 | Ross et al. | |
| 10,445,698 B2 | 10/2019 | Hunn | |
| 10,559,202 B2 | 2/2020 | Yang et al. | |
| 10,567,291 B2 | 2/2020 | Sabella et al. | |
| 10,575,244 B1* | 2/2020 | Gustafson | H04W 64/00 |
| 10,692,367 B2 | 6/2020 | Nguyen | |
| 10,778,794 B2 | 9/2020 | Wei et al. | |
| 10,938,916 B2* | 3/2021 | Enat | H04W 36/08 |
| 10,957,191 B2 | 3/2021 | Mcenroe et al. | |
| 11,164,450 B2 | 11/2021 | Tsfasman et al. | |
| 2001/0047241 A1* | 11/2001 | Khavakh | G01C 21/3415 701/410 |
| 2003/0065763 A1* | 4/2003 | Swildens | H04L 67/06 709/224 |
| 2004/0064693 A1* | 4/2004 | Pabla | G06Q 30/02 713/168 |
| 2005/0210149 A1 | 9/2005 | Kimball | |
| 2005/0273593 A1 | 12/2005 | Seminaro et al. | |
| 2008/0060054 A1 | 3/2008 | Srivastava | |
| 2010/0223364 A1* | 9/2010 | Wei | H04L 67/1097 718/1 |
| 2010/0287019 A1* | 11/2010 | Guo | H04L 67/1001 709/224 |
| 2012/0076134 A1* | 3/2012 | Brownrigg | H04L 12/413 370/352 |
| 2012/0221652 A1* | 8/2012 | Sainio | H04L 63/101 709/219 |
| 2013/0103785 A1* | 4/2013 | Lyon | H04N 21/2385 709/217 |
| 2013/0111024 A1* | 5/2013 | Setia | H04L 67/02 709/225 |
| 2013/0297669 A1 | 11/2013 | Wang | |
| 2013/0332559 A1 | 12/2013 | Ivars et al. | |
| 2014/0136952 A1 | 5/2014 | Zhu et al. | |
| 2014/0164563 A1 | 6/2014 | Leekley et al. | |
| 2015/0074296 A1* | 3/2015 | Eidelman | H04L 41/0803 710/8 |
| 2017/0366591 A1* | 12/2017 | Thomas | H04N 21/8456 |
| 2018/0041578 A1 | 2/2018 | Lee et al. | |
| 2018/0052839 A1* | 2/2018 | Sharma | G06T 7/70 |
| 2018/0130098 A1 | 5/2018 | Swanson et al. | |
| 2018/0132015 A1* | 5/2018 | Borrelli | G06F 11/3006 |
| 2018/0241814 A1* | 8/2018 | Kristiansson | H04L 67/107 |
| 2018/0288091 A1* | 10/2018 | Doron | H04L 63/1458 |
| 2018/0302440 A1 | 10/2018 | Hu et al. | |
| 2018/0331832 A1 | 11/2018 | Pulsifer | |
| 2019/0007521 A1* | 1/2019 | Lipstone | H04L 67/51 |
| 2019/0035267 A1 | 1/2019 | Balzer et al. | |
| 2019/0036764 A1 | 1/2019 | Canessa et al. | |
| 2019/0050647 A1 | 2/2019 | Malkes et al. | |
| 2019/0051166 A1 | 2/2019 | Bronk | |
| 2019/0188581 A1 | 6/2019 | Chabin et al. | |
| 2019/0199537 A1* | 6/2019 | Seo | H04L 12/12 |
| 2019/0327180 A1 | 10/2019 | Todd et al. | |
| 2019/0386995 A1 | 12/2019 | Chafe et al. | |
| 2020/0008007 A1* | 1/2020 | Belghoul | H04W 4/50 |
| 2020/0019626 A1 | 1/2020 | Todd et al. | |
| 2020/0107403 A1 | 4/2020 | Frydman et al. | |
| 2020/0125604 A1 | 4/2020 | Canessa et al. | |
| 2020/0153786 A1 | 5/2020 | Ward et al. | |
| 2020/0159511 A1 | 5/2020 | Frydman et al. | |
| 2020/0177606 A1 | 6/2020 | Valluri et al. | |
| 2020/0259836 A1* | 8/2020 | Kumar | G06F 21/6209 |
| 2020/0296155 A1* | 9/2020 | McGrath | G06F 9/5027 |
| 2020/0312128 A1* | 10/2020 | Higuchi | G08G 1/096791 |
| 2021/0027624 A1 | 1/2021 | Oberdanner et al. | |
| 2021/0044675 A1* | 2/2021 | Frydman | H04W 8/005 |
| 2021/0233045 A1* | 7/2021 | Singh | G06Q 20/12 |
| 2021/0295684 A1 | 9/2021 | Cen et al. | |
| 2021/0400485 A1 | 12/2021 | Ergen et al. | |
| 2022/0201056 A1 | 6/2022 | Zajac et al. | |
| 2022/0224759 A1* | 7/2022 | Khosrowpour | H04L 67/51 |

FOREIGN PATENT DOCUMENTS

| | | | | |
|---|---|---|---|---|
| KR | 101925268 B1 | 2/2019 | | |
| WO | WO-2018225069 A1 * | 12/2018 | | G08G 1/0112 |

* cited by examiner

MULTI-ACCESS EDGE COMPUTING FOR TRAFFIC MANAGEMENT

CROSS REFERENCES TO RELATED APPLICATIONS

This application is related to and claims priority from the following U.S. patents and patent applications. This application is a continuation-in-part of U.S. application Ser. No. 17/307,676, filed May 4, 2021, and a continuation-in-part of U.S. application Ser. No. 17/307,698, filed May 4, 2021. U.S. application Ser. No. 17/307,676 is a continuation-in-part of U.S. application Ser. No. 17/226,716, filed Apr. 9, 2021, which is a continuation of U.S. application Ser. No. 16/831,069, filed Mar. 26, 2020, and which claims the benefit of and priority from U.S. Provisional Application No. 62/838,733, filed Apr. 25, 2019. U.S. application Ser. No. 17/307,676 also claims the benefit of and priority from U.S. Provisional Application No. 63/090,265, filed Oct. 11, 2020. U.S. application Ser. No. 17/307,698, filed May 4, 2021, is a continuation-in-part of U.S. application Ser. No. 17/226,716, filed Apr. 9, 2021, which is a continuation of U.S. application Ser. No. 16/831,069, filed Mar. 26, 2020, and which claims the benefit of and priority from U.S. Provisional Application No. 62/838,733, filed Apr. 25, 2019. U.S. application Ser. No. 17/307,698 also claims the benefit of and priority from U.S. Provisional Application No. 63/090,265, filed Oct. 11, 2020. Each of the above listed applications is incorporated herein by reference in its entirety.

BACKGROUND OF THE INVENTION

1. Field of the Invention

The present invention relates to multi-access edge computing, and more specifically to providing cellular network coverage and content delivery via an edge computing platform.

2. Description of the Prior Art

It is generally known in the prior art to provide edge computing solutions wherein an edge server is able to receive and fulfill requests from client devices. The prior art also describes edge servers operable to provide wireless network access.

Prior art patent documents include the following:

U.S. Pat. No. 10,957,191 for Dynamic edge network management of vehicular traffic by inventors McEnroe, et al., filed Aug. 15, 2019 and issued Mar. 23, 2021, is directed to a method that includes determining that a prioritized vehicle plans to traverse an intersection and receiving sensor data from a plurality of sources in a vicinity of the intersection. The method also includes, based on the sensor data, determining a traffic solution to enable the prioritized vehicle to traverse the intersection, the traffic solution identifying a traffic lane and, based on the traffic solution, controlling a traffic light to cause traffic in the traffic lane to disperse and controlling a second traffic light to instruct traffic in an adjacent traffic lane to stop. The method includes instructing the prioritized vehicle to travel via the traffic lane. The traffic in the traffic lane and the traffic in the adjacent traffic lane are traveling in a same direction.

U.S. Publication No. 20210027624 for Device for Monitoring the State of Roads, Infrastructure and Traffic by inventors Oberdanner, et al., filed Mar. 15, 2019 and published Jan. 28, 2021, is directed to a device for monitoring the state of roads, infrastructure and traffic, including a plurality of sensor elements, wherein the sensor elements are arranged along at least one section of a road. The sensor elements each have a housing with an underside and an upper side. Furthermore, at least one sensor is provided for detecting a measured parameter, wherein the sensor is connected to an evaluation device arranged in the housing, in particular for autonomous evaluation of the measured parameter is acquired. The evaluation device is designed in such a way that an event and/or a state can be determined from the detected measured parameter.

U.S. Patent Publication No. 20190050647 for System and method of adaptive traffic management at an intersection by inventors Malkes, et al., filed Aug. 8, 2018 and published Feb. 14, 2019, is directed to a traffic control system and a method of automatic zone creation for a smart traffic camera to be used in adaptive traffic management at an intersection. the publication discloses a method includes receiving traffic data at an intersection; creating zones at the intersection to be applied to one or more smart traffic cameras installed at the intersection; determining whether the zones are to be validated; validating the zones upon determining that the zones are to be validated; and applying the validated zones to the one or more smart traffic cameras at the intersection.

U.S. Patent Publication No. 20210295684 for Cloud-edge-end cooperative highway cloud control system and control method by inventors Cen, et al., filed Mar. 18, 2021 and published Sep. 23, 2021, is directed to an intelligent traffic cloud control system; by making full use of technologies such as cloud computing, edge computing, big data, and artificial intelligence, the present disclosure proposes a technical architecture of a cloud-edge-end cooperative road traffic cloud control platform, which can overcome the defects of the technical architecture of existing road traffic operation management and monitoring systems. The highway cloud control platform designed and developed based on this technical architecture can improve the operational efficiency of the road network under the premise of ensuring safety, so that highway users can obtain more timely, effective, and personalized driving and traveling assistance information; moreover, practical applications such as vehicle-road cooperative autonomous driving and other functions are supported.

U.S. Pat. No. 10,692,367 for Connected and adaptive vehicle traffic management system with digital prioritization by inventor Nguyen, filed Dec. 19, 2017 and issued Jun. 23, 2020, is directed to a system for adaptively controlling traffic control devices having a traffic signal system, a computing network, a communication system, and a mobile device. The traffic signal system is configured to be in communication with the computing network through the communication system. The mobile device is also configured to be in communication with the computing network through the communication system. Then the computing network adaptively controls the traffic signal system using a location of the mobile device.

U.S. Pat. No. 11,164,450 for Traffic flow at intersections by inventors Tsfasman, et al., filed Jul. 2, 2019 and issued Nov. 2, 2021, is directed to a method for improving traffic flow at an intersection includes determining spacing data for a plurality of vehicles within traffic lanes that enable the plurality of vehicles to proceed to an intersection from a common direction, determining whether traffic flow proximate to the intersection is hindered due to spacings between the plurality of vehicles, and sending a request to at least one vehicle of the plurality of vehicles to move forward to improve the traffic flow proximate to the intersection. The spacing data may be derived from spacing-related sensor data captured by one or more vehicles of the plurality of vehicles. A corresponding apparatus and computer program product for executing the above method are also disclosed.

U.S. Patent Publication No. 20190051166 for Traffic management system, components of a distributed traffic management system, prioritization/load distribution system, and methods thereof of by inventor Bronk, filed Jun. 28, 2018 and published Feb. 14, 2019, is directed to a traffic management system that may include: a token issuer associated with a first traffic-managing infrastructure, a token collector associated with a vehicle, and a token verifier associated with a second traffic-managing infrastructure, wherein the token issuer is configured to issue one or more tokens, wherein the token collector is configured to collect the one or more tokens when the vehicle is in a vicinity of the first traffic-managing infrastructure and send the one or more collected tokens to the token verifier when the vehicle is in a vicinity of the second traffic-managing infrastructure, wherein the token verifier is configured to trigger a control of the second traffic-managing infrastructure based on the one or more collected tokens.

U.S. Patent Publication No. 20190035267 for Automated control of traffic devices with vehicles by inventors Balzer, et al., filed Jul. 2, 2017 and published Jan. 31, 2019, is directed to a number of techniques for automation of traffic control devices with vehicles. A centralized traffic control server can identify vehicles, establish priority levels for vehicles, and control the states of traffic control devices to prioritize travel of the vehicles. The identification can be based on visual information or electronically transmitted information. Furthermore, the centralized traffic control server can use organizational data and event data to help determine a priority for occupants of particular vehicles. Finally, distributed traffic control servers based on intersections or groupings of intersections can be deployed to automate control of individual traffic control devices at each traffic intersection.

U.S. Pat. No. 9,685,077 for Traffic control system by inventors Schlienz, et al., filed Nov. 24, 2015 and issued Jun. 20, 2017, is directed to a traffic control system (TCS) comprising at least one traffic control unit, TCU, equipped with a proximity enabled traffic user equipment, PETUE, and adapted to control traffic of mobile entities wherein the proximity enabled traffic user equipment, PETUE, of said traffic control unit, TCU, is configured to transmit traffic information by sending at least one discovery message, DM, directly via a user equipment to user equipment link to at least one other proximity enabled traffic user equipment, PETUE, of a mobile entity, wherein said discovery message, DM, includes a proximity service, ProSe, application identifier comprising a string of traffic labels, TLs, representing hierarchical traffic information levels.

SUMMARY OF THE INVENTION

The present invention relates to systems and methods for providing multi-access edge computing in neutral host cellular networks.

It is an object of this invention to provide systems and methods for providing cellular services to devices in an integrated multi-access edge computing architecture.

In one embodiment, the present invention provides a system for providing multi-access edge computing and content delivery, including at least one cloud platform in network communication with at least one edge device, and at least one server node, wherein the at least one cloud platform includes a cloud platform domain name system (DNS) service, an edge DNS service, at least one cloud platform application programming interface (API), at least one cloud platform router, a cloud platform database, and a node database, wherein the at least one cloud platform is in network communication with the at least one server node, wherein the at least one cloud platform is operable to fetch node data from the at least one server node, wherein the at least one cloud platform is operable to receive a hypertext transfer protocol (HTTP) request from the at least one edge device, wherein the at least one cloud platform is operable to execute the HTTP request using the at least one server node, wherein the at least one server node is operable to create at least one network, and wherein the at least one server node is operable to deliver network services to the at least one edge device through the at least one network.

In another embodiment, the present invention provides a system for providing multi-access edge computing and content delivery, including at least one cloud platform in network communication with at least one edge device, and a plurality of server nodes, wherein the at least one cloud platform includes a cloud platform domain name system (DNS) service, an edge DNS service, at least one cloud platform application programming interface (API), at least one cloud platform router, a cloud platform database, and a node database, wherein the at least one cloud platform is in network communication with the plurality of server nodes, wherein the plurality of server nodes is operable for network communication with each other, wherein the at least one cloud platform is operable to receive a hypertext transfer protocol (HTTP) request from the at least one edge device, wherein the at least one cloud platform is operable to query the node database for a nearest node from the plurality of server nodes, wherein the at least one cloud platform is operable to execute the HTTP request using the nearest node, wherein each of the plurality of server nodes is operable to create at least one network, and wherein each of the plurality of server nodes is operable to deliver network services to the at least one edge device through the at least one network.

In yet another embodiment, the present invention provides a method for providing multi-access edge computing and content delivery, including at least one cloud platform in network communication with at least one edge device and a plurality of server nodes resolving a hypertext transfer protocol (HTTP) request, wherein the at least one cloud platform includes a cloud platform domain name system (DNS) service, an edge DNS service, at least one cloud platform application programming interface (API), at least one cloud platform router, a cloud platform database, and a node database, wherein the plurality of server nodes is operable for network communication with each other, wherein the at least one cloud platform resolving the HTTP request includes the at least one cloud platform receiving an HTTP request from the at least one edge device, the at least one cloud platform querying the node database for a nearest node from the plurality of server nodes, and the at least one cloud platform executing the HTTP request on the nearest node, the plurality of server nodes creating at least one network, and the plurality of server nodes delivering network services to the at least one edge device through the at least one network.

These and other aspects of the present invention will become apparent to those skilled in the art after a reading of the following description of the preferred embodiment when considered with the drawings, as they support the claimed invention.

DETAILED DESCRIPTION

Figure 1:
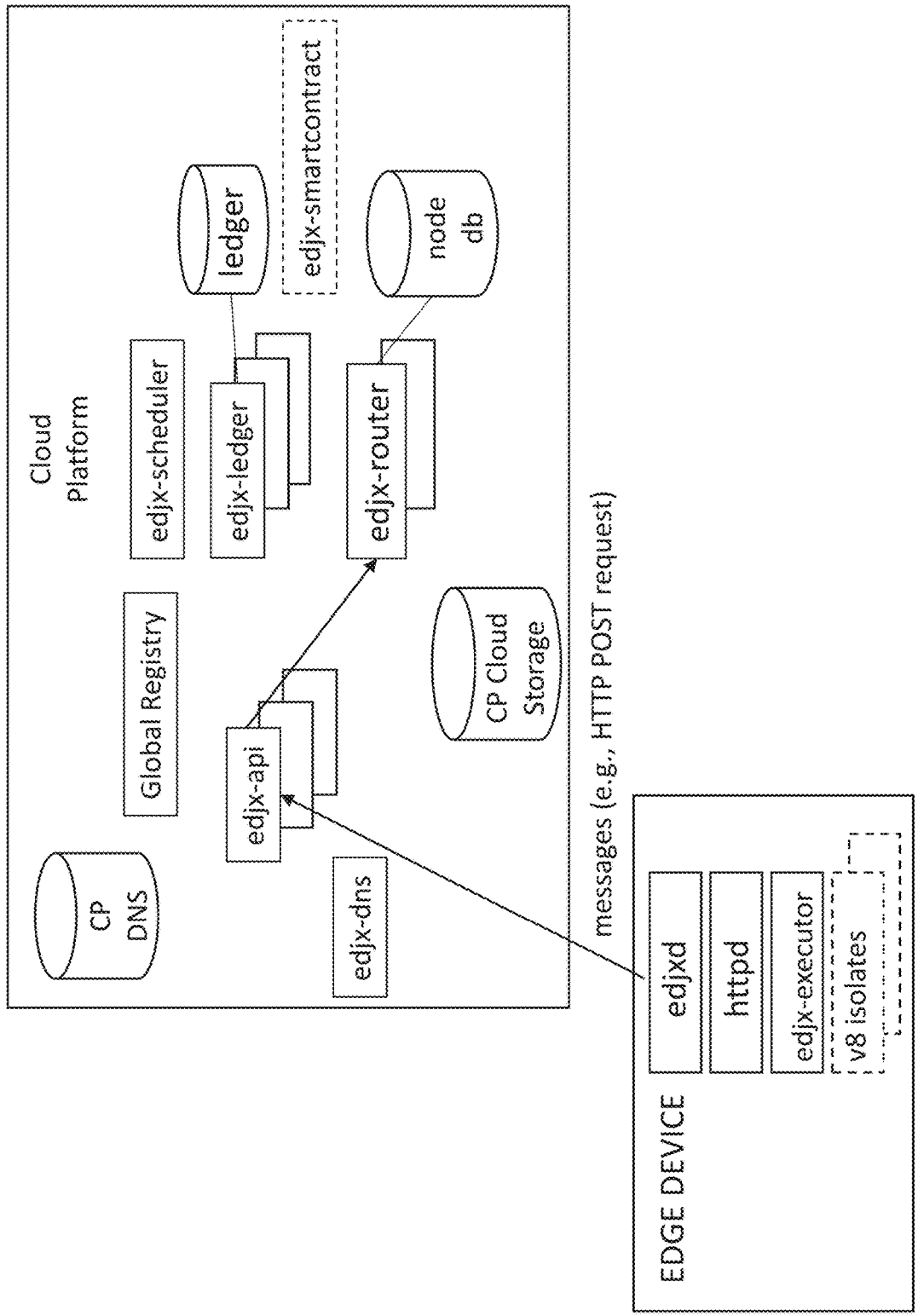
FIG. 1 illustrates a system for locating server nodes for edge devices using latency-based georouting according to one embodiment of the present invention.

The present invention is generally directed to multi-access edge computing and content delivery.

In one embodiment, the present invention provides a system for providing multi-access edge computing and content delivery, including at least one cloud platform in network communication with at least one edge device, and at least one server node, wherein the at least one cloud platform includes a cloud platform domain name system (DNS) service, an edge DNS service, at least one cloud platform application programming interface (API), at least one cloud platform router, a cloud platform database, and a node database, wherein the at least one cloud platform is in network communication with the at least one server node, wherein the at least one cloud platform is operable to fetch node data from the at least one server node, wherein the at least one cloud platform is operable to receive a hypertext transfer protocol (HTTP) request from the at least one edge device, wherein the at least one cloud platform is operable to execute the HTTP request using the at least one server node, wherein the at least one server node is operable to create at least one network, and wherein the at least one server node is operable to deliver network services to the at least one edge device through the at least one network. In one embodiment, the at least one server node includes a node identifier (ID), an internet protocol (IP) address, a set of global positioning system (GPS) coordinates, a central processing unit (CPU) ID, a version number, an uptime value, a node heartbeat value, an edge executor, a plurality of v8 isolates, and/or time zone data. In one embodiment, the at least one server node is registered in a cloud platform global registry using an HTTP POST request to a global service address and wherein the cloud platform global registry is associated with the at least one cloud platform. In one embodiment, the at least one cloud platform is operable to fetch node data from the at least one server node using an object-oriented function and wherein the object-oriented function is a serverless function. In one embodiment, the at least one server node includes a radio network node. In one embodiment, the at least one server node is operable to perform at least one evolved packet core (EPC) function. In one embodiment, the at least one network is a vehicular network. In one embodiment, the at least one edge device includes at least one vehicle. In one embodiment, the at least one edge device includes at least one sensor, wherein the at least one sensor includes a motion sensor, an acceleration sensor, an electromagnetic sensor, a location sensor, a sound sensor, a camera, a temperature sensor, a humidity sensor, an object sensor, an air pressure sensor, a precipitation sensor, an anemometer, a light sensor, an air quality sensor, a chemical sensor, an ammeter, a voltmeter, a power meter, a magnetic field sensor, an orientation sensor, and/or an acceleration sensor. In one embodiment, the at least one server node is operable to implement at least one access policy. In one embodiment, the at least one cloud platform is operable to implement quality of service (QOS) mechanisms on the at least one network.

In another embodiment, the present invention provides a system for providing multi-access edge computing and content delivery, including at least one cloud platform in network communication with at least one edge device, and a plurality of server nodes, wherein the at least one cloud platform includes a cloud platform domain name system (DNS) service, an edge DNS service, at least one cloud platform application programming interface (API), at least one cloud platform router, a cloud platform database, and a node database, wherein the at least one cloud platform is in network communication with the plurality of server nodes, wherein the plurality of server nodes is operable for network communication with each other, wherein the at least one cloud platform is operable to receive a hypertext transfer protocol (HTTP) request from the at least one edge device, wherein the at least one cloud platform is operable to query the node database for a nearest node from the plurality of server nodes, wherein the at least one cloud platform is operable to execute the HTTP request using the nearest node, wherein each of the plurality of server nodes is operable to create at least one network, and wherein each of the plurality of server nodes is operable to deliver network services to the at least one edge device through the at least one network. In one embodiment, the at least one cloud platform selects the nearest node based on a geolocation of the at least one edge device and/or a latency value corresponding to the at least one edge device. In one embodiment, the system further includes at least one load balancer wherein the at least one load balancer is operable to distribute traffic across the plurality of server nodes. In one embodiment, the plurality of server nodes are microservers and wherein the plurality of server nodes is operable to form a peer-to-peer (P2P) network. In one embodiment, each of the plurality of server nodes is operable to maintain a pool of persistent connections.

In yet another embodiment, the present invention provides a method for providing multi-access edge computing and content delivery, including at least one cloud platform in network communication with at least one edge device and a plurality of server nodes resolving a hypertext transfer protocol (HTTP) request, wherein the at least one cloud platform includes a cloud platform domain name system (DNS) service, an edge DNS service, at least one cloud platform application programming interface (API), at least one cloud platform router, a cloud platform database, and a node database, wherein the plurality of server nodes is operable for network communication with each other, wherein the at least one cloud platform resolving the HTTP request includes the at least one cloud platform receiving an HTTP request from the at least one edge device, the at least one cloud platform querying the node database for a nearest node from the plurality of server nodes, and the at least one cloud platform executing the HTTP request on the nearest node, the plurality of server nodes creating at least one network, and the plurality of server nodes delivering network services to the at least one edge device through the at least one network. In one embodiment, the method further includes the at least one cloud platform selecting the nearest node based on a geolocation of the at least one edge device and/or a latency value corresponding to the at least one edge device. In one embodiment, the method further includes the plurality of server nodes forming a peer-to-peer (P2P) network. In one embodiment, the at least one network is a vehicular network.

In one embodiment, the present invention is a system for providing multi-access edge computing and content delivery including at least one cloud platform in network communication with at least one edge device and at least one server node, wherein the at least one cloud platform includes a cloud platform domain name system (DNS) service, an edge DNS service, at least one cloud platform application programming interface (API), at least one cloud platform router, a cloud platform database, a node database, and a cloud platform storage component, wherein the at least one cloud platform is in network communication with the at least one server node, wherein the at least one cloud platform is operable to fetch node data from the at least one server node, wherein the at least one cloud platform is operable to receive a hypertext transfer protocol (HTTP) request from the at least one edge device, wherein the at least one cloud platform is operable to execute the HTTP request using the at least one server node, wherein the at least one server node is operable to create at least one network, and wherein the at least one server node is operable to deliver network services to the at least one edge device through the at least one network. In one embodiment, the at least one network is a vehicular network and/or a cellular network.

In one embodiment, the at least one server node includes a node identifier (ID), an internet protocol (IP) address, a set of global positioning system (GPS) coordinates, a central processing unit (CPU) ID, a version number, an uptime value, a node heartbeat value, an edge executor, a plurality of v8 isolates, and/or time zone data. In another embodiment, the at least one server node is registered in a cloud platform global registry using an HTTP POST request to a global service address and wherein the cloud platform global registry is associated with the at least one cloud platform. In another embodiment, the at least one cloud platform is operable to fetch node data from the at least one server node using an object-oriented function and wherein the object-oriented function is a serverless function. In another embodiment, the at least one server node includes a radio network node. In one embodiment, the at least one server node is operable to perform at least one evolved packet core (EPC) function. In another embodiment, the at least one cellular network is a neutral host cellular network. In another embodiment, the at least one server node is operable to implement at least one access policy. In one embodiment, the at least one server node is operable to register the at least one edge device. In another embodiment, the at least one cloud platform is operable to implement quality of service (Qos) mechanisms on the at least one network.

In another embodiment, the present invention is a system for providing multi-access edge computing and content delivery including at least one cloud platform in network communication with at least one edge device and a plurality of server nodes, wherein the at least one cloud platform includes a cloud platform domain name system (DNS) service, an edge DNS service, at least one cloud platform application programming interface (API), at least one cloud platform router, a cloud platform database, a node database, and a cloud platform storage component, wherein the at least one cloud platform is in network communication with the plurality of server nodes, wherein the plurality of server nodes is operable for network communication with each other, wherein the at least one cloud platform is operable to receive a hypertext transfer protocol (HTTP) request from the at least one edge device, wherein the at least one cloud platform is operable to query the node database for a nearest node from the plurality of server nodes, wherein the at least one cloud platform is operable to execute the HTTP request using the nearest node, wherein each of the plurality of server nodes is operable to create at least one network, and wherein each of the plurality of server nodes is operable to deliver network services to the at least one edge device through the at least one network. In one embodiment, the at least one network is a vehicular network and/or a cellular network. In one embodiment, the at least one edge device includes a vehicle.

In one embodiment, the at least one cloud platform selects the nearest node based on a geolocation of the at least one edge device and/or a latency value corresponding to the at least one edge device. In another embodiment, the system further includes at least one load balancer wherein the at least one load balancer is operable to distribute traffic across the plurality of server nodes. In one embodiment, the plurality of server nodes are microservers and wherein the plurality of server nodes is operable to form a global peer-to-peer (P2P) network. In one embodiment, each of the plurality of server nodes is operable to maintain a pool of persistent connections. In another embodiment, the plurality of server nodes is operable to store data in a content-addressable peer-to-peer storage network.

In yet another embodiment, the present invention is a method for providing multi-access edge computing and content delivery including at least one cloud platform in network communication with at least one edge device and a plurality of server nodes resolving a hypertext transfer protocol (HTTP) request wherein the at least one cloud platform includes a cloud platform domain name system (DNS) service, an edge DNS service, at least one cloud platform application programming interface (API), at least one cloud platform router, a cloud platform database, a node database, and a cloud platform storage component, wherein the plurality of server nodes is operable for network communication with each other, wherein the at least one cloud platform resolving the HTTP request includes the at least one cloud platform receiving an HTTP request from the at least one edge device, the at least one cloud platform querying the node database for a nearest node from the plurality of server nodes, and the at least one cloud platform executing the HTTP request on the nearest node, the plurality of server nodes creating at least one network, and the plurality of server nodes delivering network services to the at least one edge device through the at least one network. In one embodiment, the at least one network is a vehicular network and/or a cellular network. In one embodiment, the at least one edge device includes a vehicle.

In one embodiment, the method further includes the at least one cloud platform selecting the nearest node based on a geolocation of the at least one edge device and/or a latency value corresponding to the at least one edge device. In another embodiment, the method further includes the plurality of server nodes forming a global peer-to-peer (P2P) network. In yet another embodiment, the at least one cellular network is a neutral host network.

Currently, mobile network operators rely on centralized switching centers to deliver wireless data services to devices. Each mobile network operator sets up its own base stations to create coverage areas. The physical infrastructure of each mobile network operator means that data packets requested by a device are sent from a base station to the centralized switch to fetch data and run apps, adding significant backhaul and latency of 40-150 ms on average. In roaming situations such as international travel, wherein a device uses (roams onto) a network that is different from its typical carrier, packets travel through the roaming network and then to the typical carrier's network, adding further delays. This process does not use edge processing or an edge-based infrastructure wherein the base stations are operable to access the internet and/or function as edge nodes. In order to provide true edge computing services to devices on their networks, mobile network operators would need to set up edge nodes throughout their coverage areas. The logistical requirements and financial costs of building this infrastructure for a single mobile network operator are prohibitive, resulting in the continued use of the current system of centralized servers. Furthermore, mobile network operators incur significant costs in transmitting data from the central switch to the mobile device and vice versa. The present invention improves on the existing framework by providing local internet breakout close to mobile subscribers and devices, dramatically reducing latency and cost. Further, it provides a method for multiple mobile operators to connect to the same localized compute infrastructure through neutral host functionality.

The present invention utilizes a distributed edge computing platform (sometimes referred to as "EDJX") to deliver multi-access edge computing (MEC) and cellular network access on a mobile network and to any device. The edge computing platform reduces latency and increases network throughput to devices by locating edge server nodes in close proximity to the mobile devices. The edge computing platform of the present invention is operable to write, test, and deploy low-latency edge applications on the edge server nodes. The edge computing platform is further operable to execute serverless functions or otherwise retrieve data from the edge server nodes located in close proximity to the client. The edge computing platform is Application Programming Interface (API) compatible with cloud infrastructures including, but not limited to, GOOGLE CLOUD PLATFORM, AMAZON WEB SERVICES (AWS), and MICROSOFT AZURE.

The present invention includes a network of edge platform nodes operable to provide enhanced mobile coverage and accelerated content delivery for private and/or public mobile network operator (MNO) customers. The present invention is operable to create a private cellular network (e.g., a private wireless 4G/5G cellular network), wherein the private cellular network is also accessible by devices of mobile networks outside of the private cellular network while still maintaining necessary privacy and quality of service. The edge computing platform is operable to process data in real time and provide ultra-low latency cellular access, compute resources, and/or content delivery to mobile devices. In one embodiment, the edge computing platform is operable to use latency-based georouting to determine the nearest edge platform node in the network of edge platform nodes for ultra-low latency. In another embodiment, the edge computing platform is further operable to implement a content-addressed intelligent content delivery network (CDN) on the edge platform node to further reduce latency. The wireless network is operable to integrate with femtocells (e.g., 5G femtocells), WI-FI access points, and/or broadband customer premise equipment. The present invention is further operable to create a public cellular network (e.g., a public wireless 4G/5G cellular network) using the same node infrastructure and edge computing platform as the private cellular network.

An edge device is any device which provides an entry point into enterprise or service provider core networks. Examples include, but are not limited to, routers, routing switches, integrated access devices (IADs), multiplexers, metropolitan area network (MAN) access devices, wide area network (WAN) access devices, IoT devices, sensors, industrial machines, personal computing devices, laptop computing devices, tablet computing devices, mobile computing devices, cameras, smartphones, and any other device that produces and/or collects data. In one embodiment, an edge device is also operable for mobile broadband access and/or data roaming.

Additional information about edge computing systems is found in U.S. application Ser. No. 17/226,716, filed Apr. 9, 2021, U.S. application Ser. No. 16/831,069, filed Mar. 26, 2020, and U.S. Provisional Application No. 63/090,265, filed Oct. 11, 2020, each of which is incorporated herein by reference in its entirety.

Referring now to the drawings in general, the illustrations are for the purpose of describing one or more preferred embodiments of the invention and are not intended to limit the invention thereto.

Edge Platform Nodes (EDJX-Node):

Nodes in the edge platform network are computing systems that run the edge platform software stack. In one embodiment, the edge platform software stack includes a client tier, a web tier, a business tier, and a database tier. In another embodiment, the edge platform software stack comprises an HTTP process, a query layer, an HTTP endpoint operable to interact with serverless functions, a runtime environment. In one embodiment, the runtime environment uses an event-driven architecture operable for asynchronous Input/Output (I/O). In one embodiment, the runtime environment is Node.js. In another embodiment, the runtime environment is operable to execute code outside of a browser. In one embodiment, the edge platform stack is a full stack. In one embodiment, at least part of the edge platform stack is coded in PHP. In another embodiment, at least part of the edge platform stack is coded in Javascript.

Nodes are identified by a globally unique identifier (GUID) that is generated the first time a node is powered on. In one embodiment, the system includes a plurality of node types including, but not limited to, a greedy node, a non-greedy node, a bootstrap node, and/or a super node. Edge platform nodes are responsible for serving HTTP requests from designated edge devices. Edge platform nodes themselves are HTTP clients of the edge platform. In one embodiment, each node in the edge platform network includes at least one v8 isolate. Isolates are lightweight contexts which group variables where code is allowed to mutate/change them. A single process is operable to run hundreds or thousands of isolates and seamlessly switch between them.

Mobile Edge Platform Node

In one embodiment, the edge platform node is a mobile edge Platform Node operable to provide MEC to a mobile device regardless of the MNO of the mobile device. Platform Nodes are customizable computer and storage hardware solutions that are operable to be sized for each use case with regard to number of subscribers and/or edge application compute requirements. The mobile edge platform node is operable to act as a radio access node, a compute node, and/or a content delivery node to at least one mobile device. In one embodiment, the mobile edge platform node is a radio mast with direct access to the internet to deliver wireless internet content. As a non-limiting example, the mobile edge platform node is as compact as a 40 cm by 20 cm structure. The mobile edge platform node is operable to extend the signal of an MNO to a user device (e.g., smartphone, tablet, laptop, edge device) and to run the software stack of the MNO and operate as a traditional base station subsystem in order to allow network access. In one embodiment, the mobile edge platform node is operable to generate a macrocell. Alternatively, the mobile edge platform node is operable to act as a picocell. In yet another embodiment, the mobile edge platform node is operable to integrate with picocells, femtocells, WI-FI access points, and/or other broadband customer premise equipment from a mobile network operator. In one embodiment, the mobile edge platform node integrates with existing MNO infrastructure at tower/mast locations. In one embodiment, the mobile edge platform node includes at least one network entry point (e.g., a fiber patch). The at least one network entry point feeds appropriate signaling to the edge computing platform. Data and applications then flow from the edge computing platform to mobile subscribers and/or edge devices. The mobile edge platform node is preferably a neutral host in that the mobile edge platform node is operable to provide cellular services to a device independent of the carrier typically used by the device. The mobile edge platform node is further operable to provide the same cellular services to devices across multiple different carriers. The cellular services include but are not limited to speech transcoding, radio channel allocation, paging, signal transmission, signal reception, content delivery, internet access, application execution, phone calls, broadcasting, and/or wireless broadband. The mobile edge platform node is connected directly to the internet and provides internet breakout to a device. As previously discussed, it is cost prohibitive for most carriers to build infrastructure for these services independently because the infrastructure only functions for the independent carrier. Advantageously, the mobile edge platform node is operable to function as a neutral host and provide services to devices from multiple carriers, thus providing a cost savings for MNOs.

In one embodiment, the mobile edge platform node includes a radio network node ("xNodeB") wherein the radio network node is the hardware that is connected to a cellular network and that communicates with a user device and/or user equipment and wherein the radio network node facilitates wireless communication between the user device and/or user equipment and the cellular network. In one embodiment, the radio network node is operable to perform network control functions and/or create cellular network coverage. In one embodiment, the radio network node is an evolved NodeB (eNodeB) for 4G and/or LTE networks. The eNodeB is operable to use separate radio access technologies for uplink communications and downlink communications. As a non-limiting example, the eNodeB uses orthogonal frequency division multiple access (OFDMA) for the downlink communications and single carrier frequency division multiple access (SC-FDMA) for the uplink communications. Alternatively, the radio network node is a next-generation eNodeB (ng-eNB). In another embodiment, the radio network node is a next generation NodeB (gNB) for 5G networks. Alternatively, the radio network node is a NodeB for pre-4G networks. Radio network node infrastructure and/or base station infrastructure for networks beyond 5G are also compatible with the present invention. The radio network node is operable to manage radio resources in the surrounding cell in order to optimize communication between a wireless device and radio infrastructure. The radio network node functions for resource management include but are not limited to radio bearer control, radio admission control, connection mobility control, radio access functions, and/or dynamic allocation of resources in uplink and downlink communications. In another embodiment, the mobile edge platform node is operable to perform the radio network node functions as a replacement for a NodeB. Advantageously, the radio network node includes its own radio network control functionality and does not need a separate radio network controller (RNC). In one embodiment, the radio network node interfaces with the evolved packet core. In one embodiment, the radio network node implementation further reduces latency by $3^{rd}$ generation partnership project (3GPP) protocol-defined stack cutting, which allows more direct transmission of data packets. The mobile edge platform node implements and adheres to mechanisms and protections provided by 3GPP standards including but not limited to the technical specifications described in "3GPP TS 33.501 V15.3.0 (2018-12) Technical Specification 3rd Generation Partnership Project; Technical Specification Group Services and Systems Aspect; Security architecture and procedures for 5G system (Release 15)," which is incorporated herein by reference in its entirety.

Node Registry and Router (EDJX-Router):

The edge platform nodes periodically contact a centralized registry component (sometimes referred to as "EDJX-router"). This edge platform router is a distributed application that provides an interface for registering information about the edge platform nodes.

In one embodiment, the interface used is a Representational State Transfer (REST) interface. Separating the user interface concerns from the data storage concerns improves the flexibility of the interface across platforms and improves scalability by simplifying the server components. By using a REST interface, different clients hit the same REST endpoints, perform the same actions, and receive the same responses. Alternatively, the interface used for registering information about the edge platform nodes is another architectural style for distributed hypermedia systems, including but not limited to a GRAPHQL interface, a Falcor interface, or a Simple Object Access Protocol (SOAP) interface.

Node registrations, heartbeats, and other activities are conducted by a daemon on each edge platform node. The node process periodically collects system information and posts it to the edge platform API to be included among the nodes collection maintained by an edge platform router. The collected system information includes, but is not limited to, static information such as hardware data, baseboard data, bios data, OS, version data, Central Processing Unit (CPU) data, network interface data, memory, and/or disk layout, as well as dynamic data such as user data, CPU-speed, load data, processes, services, temperature, file system data, network data, and/or disk statistics.

Nodes register themselves in the edge platform's global registry by issuing an HTTP POST request to a global service address. The hostname resolves to a set of load balanced instances of the edge platform's API component. The edge platform's API component authenticates the API and proxies the request to the edge platform router service, which persists the data.

The HTTP POST request contains node information including, but not limited to, a GUID, a latitude, a longitude, a zip code, a street address, CPU information, a version number, an uptime, a time zone, and/or an Internet Protocol (IP) address. In one embodiment, the IP address is an IPV6 address. In another embodiment, the IP address is an IP version beyond IPV6.

The act of first-time node registration and subsequent node updates are not differentiated. Rather, the posting of a node to the nodes collection is a destructive update, and the update time is treated as a node heartbeat. A node heartbeat is a signal that is generated at regular intervals to indicate that the node is working correctly. If a node heartbeat is not sent, the node is considered to be unreachable. Regarding node heartbeats, there are two main values: a heartbeat interval and a heartbeat timeout. The heartbeat interval refers to an interval where a request is sent to a node at a set time interval, where the node responds to the request directly. If there is no response from the node, the request determines that the node is inactive. Heartbeat timeout refers to the time interval since the last heartbeat was received by the node. This heartbeat timeout value is greater than the heartbeat interval value. If a node has not received a response from the request in the time specified by the heartbeat timeout value, the node assumes the request has ended.

The present invention further includes load balancers. Load balancers are devices that act as reverse proxies and distribute network or application traffic across a number of servers. Load balancers are used to increase capacity (concurrent users) and reliability of applications. They improve overall performance of applications by decreasing the burden on servers associated with managing and maintaining application and network sessions, as well as performing application-specific tasks.

Node Database and Geolocation:

The edge platform router persists the node data to a table within a cloud platform database called an edge platform node database. The edge platform node database is operable to be queried and return a list and/or set of nodes. The edge platform node database is further operable to return an aggregated metric relating to node performance. In one embodiment, the edge platform node database is an object-relational database system. An object-relational database system is a database system that is similar to a relational database, except that it has an object-oriented database model. This system supports objects, classes and inheritance in database schemas and query language. In one embodiment, the edge platform node database is a PostgreSQL database. In one embodiment, the edge platform node database instance is extended by the PostGIS extension for geographic objects. PostGIS is a database extension for an object-relational database. It adds support for geographic objects allowing location queries to be run in SQL.

According to one embodiment of the present invention, geolocation of an edge device is determined using a Global Positioning System (GPS). In another embodiment, the geolocation of an edge device is determined based on a Cell ID, where the edge device is a smart phone, cellular telephone, or any other device capable of communication with a cell tower. A Cell ID determines which sector of which base station a given edge device is using and, using a database of base-station identification numbers and locations, an edge device's location is associated with that of the identified cell tower.

In another embodiment, the geolocation of an edge device is determined based on WI-FI. Geolocation based on WI-FI makes use of received signal strength indication (RSSI), where signals detected by an edge device from nearby access points are referenced to a database of WI-FI networks. The database is operable to store location information for each uniquely identified access point. Using signal strength to determine distance from known access points, RSSI determines where an edge device is located in relation to the known access points. In one embodiment, the relative location is converted into an absolute location. In yet another embodiment, another form of WI-FI geolocation is used, e.g., wireless fingerprinting. Wireless fingerprinting uses profiles of WI-FI signals from multiple access points and/or devices to characterize an area. Each WI-FI access point is recorded along with a location and base station ID (BSSID) to create a fingerprint. The wireless fingerprint is then stored in a database. The database is used to determine the indoor location of a device based on the WI-FI environment relative to the device.

In another embodiment, the geolocation of an edge device is determined based on at least one sensor. As a non-limiting example, the at least one sensor is an inertial sensor. Inertial sensors keep track of an edge device's location using a combination of inputs including, but not limited to, a compass/magnetometer and an accelerometer. In another embodiment, the at least one sensor is a barometer. While outdoor navigation typically occurs on one level, either going straight or turning, elevation is a concern when navigating indoors. Since altitude is closely related to air pressure, the use of a barometer provides an accurate means of location.

In one embodiment, the geolocation of an edge device is determined based on ultrasonic technologies, such as radio-frequency identification (RFID) or near-field communications (NFC). In another embodiment, the geolocation of an edge device is determined based on BLUETOOTH beacons. BLUETOOTH beacons are placed every few meters and are operable to communicate with any device equipped with BLUETOOTH version 4.0, 4.1, 4.2, 5, 5.1, 5.2, or greater. In yet another embodiment, the geolocation of an edge device is determined based on terrestrial transmitters. Terrestrial transmitters are location transmitters that use the same principle as GPS, but are mounted on buildings and cell towers. Since the terrestrial transmitters are stationary and provide a much stronger signal to receivers than satellites do from space, the terrestrial transmitters are operable to pinpoint an edge device's location near-instantaneously.

In another embodiment, an edge device's geolocation is determined using Hyper Text Markup Language 5 (HTML5). HTML5 is the next major revision of the HTML standard superseding HTML 4.01, XHTML 1.0, and XHTML 1.1. HTML5 (e.g., HTML 5, HTML 5.1, HTML 5.2) is a standard for structuring and presenting web content on the World Wide Web. In another embodiment, an edge device's geolocation is determined using an HTML version beyond HTML5.

In another embodiment, an edge device's geolocation is determined using a combination of at least two of the previously mentioned geolocation techniques.

In one embodiment, the present invention provides systems and method for locating mobile edge platform nodes for edge devices using latency-based georouting and/or download time-based georouting in a distributed edge computing platform as described in U.S. Pat. No. 10,986,173, which is incorporated herein by reference in its entirety. Latency refers to the delay before a transfer of data begins following an instruction for its transfer and download time refers to the number of bytes per second that data travels from a remote and/or local server to a user's edge device. Georouting relies on geographical information such that a message from the device is routed to a destination edge platform node based on geographic location rather than network address. Georouting reduces latency by using the shortest path in physical distance and executing requests on a nearest node to the edge device. In one embodiment, the georouting and/or the detection of the nearest node does not require knowledge of network topology or a prior route discovery.

In one embodiment, a georouting system includes at least one edge device, at least one edge platform node, and at least one cloud platform. The at least one edge device is operable to store location information and contains a HyperText Transfer Protocol (HTTP) client. The at least one cloud platform includes a cloud platform DNS, an edge platform DNS, a plurality of edge platform APIs, an edge platform scheduler, a ledger containing a plurality of edge platform ledgers and operable to interact with at least one edge platform smart contract, a node database containing a plurality of edge platform routers, and/or a storage component for the cloud platform. The at least one edge platform node contains an Internet Protocol (IP) address, an edge platform executor, a plurality of v8 isolates, and/or at least one HTTP server program. The HTTP client of the at least one edge device is operable to communicate with both the cloud platform DNS and the edge platform DNS, where the edge platform DNS is in network communication with the plurality of edge platform routers in the node database. FIG. 1 illustrates a system for locating server nodes for edge devices using latency-based georouting according to one embodiment of the present invention.

In one embodiment, a georouting system includes a plurality of edge devices, a plurality of edge platform nodes, and/or at least one cloud platform. Each of the plurality of edge devices is operable to store location information and/or an HTTP client. The at least one cloud platform includes a cloud platform DNS, an edge platform DNS, a plurality of edge platform APIs, at least one edge platform scheduler, a ledger containing a plurality of edge platform ledgers operable to interact with at least one edge platform smart contract, at least one node database containing a plurality of edge platform routers, and/or a storage component for the cloud platform. The plurality of edge platform nodes store information relating to, but not limited to, an IP address, an edge platform executor, a plurality of v8 isolates, and/or at least one HTTP server program. The HTTP client of each of the plurality of edge devices is in network communication with the cloud platform DNS and the edge platform DNS, where the edge platform DNS is in network communication with the plurality of edge platform routers in the at least one node database. In one embodiment, the at least one cloud platform is public. In another embodiment, the at last one cloud platform is private. In another embodiment, the location information of the plurality of edge devices is real-time or near real-time location information.

In another embodiment, at least one edge device is in network communication with at least one cloud platform. The at least one edge device is operable to store location information and/or at least one HTTP client. The at least one cloud platform includes a cloud platform DNS, an edge platform DNS, a plurality of edge platform APIs in communication with a plurality of edge platform routers where the plurality of edge platform routers are stored in a cloud platform node database, an edge platform scheduler, a plurality of edge platform ledgers stored in at least one cloud platform ledger, and/or at least one cloud platform storage component. The at least one cloud platform ledger is operable to interact with edge platform smart contracts. The at least one edge device is in network communication with a plurality of edge platform nodes. The plurality of edge platform nodes each contain an IP address, a node ID, an edge platform executor, and/or a plurality of v8 isolates. The plurality of edge platform nodes is operable to receive an HTTP request from the at least one edge device. In one embodiment, the IP address is an IPV6 address. In another embodiment, the IP address is a future IP version beyond IPV6.

In one embodiment, an edge platform router and/or an edge platform API responds to an initial HTTP request from an edge device by injecting a HTML page that invokes a JavaScript function on the edge device. The edge device executes the JavaScript function, where the JavaScript function has been pre-populated with a subset of edge platform nodes in order to conduct its own latency-based geolocation of the edge device. In this embodiment, geolocation is an initial estimate of the edge device's general vicinity. The function uses latency and other measures to select at least one nearest edge platform node to the edge device. The combination of geolocation and latency, and/or other measures, completes the georouting process. Other measures include, but are not limited to, download speed/time, upload speed, and/or response time. In one embodiment, the latency-based georouting distinguishes between successful HTTP requests and unsuccessful HTTP requests when calculating latency, download speed/time, upload speed, response time, and/or combinations thereof.

In one embodiment, at least one edge device is directed to at least one nearest edge platform node. Alternatively, the at least one edge device acts as an edge platform node. The at least one edge device is in network communication with a cloud platform. The at least one edge device is operable to store location information and/or an HTTP client. The cloud platform includes a cloud platform DNS, an edge platform DNS, a plurality of edge platform APIs, an edge platform scheduler, a plurality of edge platform ledgers in communication with a cloud platform ledger wherein the cloud platform is operable to interact with at least one edge platform smart contract, a cloud platform storage component, and/or a cloud platform node database operable to store a plurality of edge platform routers, wherein the plurality of edge platform routers are in network communication with the plurality of edge platform APIs. The HTTP client of the at least one edge device queries the plurality of edge platform APIs for a hostname, where the at least one edge device's current location is appended as query parameters to the Uniform Resource Identifier (URI). The plurality of edge platform APIs replies to the at least one edge device's request with a HTML page, wherein the HTML page contains at least one JavaScript function. The at least one JavaScript function is operable to fetch information from the plurality of edge platform nodes. The HTTP client of the at least one edge device executes each request to the plurality of edge platform nodes in parallel. The HTTP client of the at least one edge device determines the best host edge platform node using latency-based or download time-based georouting. Alternatively, the at least one JavaScript function is operable to fetch an object from a plurality of edge platform nodes, where each request is performed in parallel.

In one embodiment, a nearest edge platform node is located using Johnson's All Pairs Shortest Path Algorithm. In another embodiment, the algorithm used is Floyd-Warshall's All Pairs Shortest Path algorithm. Alternatively, the nearest edge platform node is solved using another algorithm, for example but not for limitation, Shortest Path A*, Bi-Directional Dijkstra Shortest Path, Bi-Directional A* Shortest Path, Shortest Path Dijkstra, Driving Distance, K-Shortest Path (Multiple Alternative Paths), K-Dijkstra (One to Many Shortest Path), Traveling Sales Person, and/or Turn Restriction Shortest Path (TSRP).

In another embodiment, an HTTP client of an edge device queries an edge platform API and/or an edge platform router. The edge platform API and/or the edge platform router responds to the query of the edge device with a HTML page containing at least one JavaScript function. The at least one JavaScript function is pre-populated to request information from a plurality of edge platform nodes. The edge device executes each request from the plurality of edge platform nodes in parallel. The edge device determines the best host edge platform node using latency-based georouting and/or download time-based georouting. Alternatively, the HTML page contains at least one function in a programming language other than JavaScript.

Content Delivery Network

The network of mobile edge platform nodes is operable to create a content delivery network (CDN) for delivering content to edge devices. A CDN is a network of servers and data centers geographically distributed over an area to increase availability and performance by locating services closer to end users. CDNs provide internet content including but not limited to web objects (e.g., text, images, scripts), downloadable objects (e.g., media files, software), applications, and streaming. In a preferred embodiment, the mobile edge platform nodes of the CDN of the present invention are operable to provide content to devices regardless of the MNO associated with each of the devices.

The platform of the present invention provides a content-addressed data network (sometimes referred to as "EdjNet") as described in U.S. Provisional Patent Application No. 63/090,265 which is incorporated herein by reference in its entirety, which enables the transparent, opportunistic, and secure dissemination of data between nodes in a peer-to-peer network. The platform includes a peer-to-peer protocol that uses cryptographic identities, delegation of trust, and end-to-end encryption, to create a global namespace for self-validating data that runs transparently over IPv4 and/or IPv6 networks. In a preferred embodiment, the system encrypts data including, but not limited to, network traffic, stored data, and logs.

Modern CDNs operate with tens to hundreds of points of presence (POPs) in major metropolitan areas. These POPs are generally co-located in carrier-neutral data centers. The CDNs provide value by caching content in these POPs and servicing users in the general vicinity through local last-mile networks. The CDN of the present invention extends even further from these POPs to get closer to end users and devices than previously possible. The POPs of the present invention not only include carrier-neutral data centers, but office buildings, residential buildings, industrial sites, 5G microcells and femtocells, WI-FI access points, etc. The CDN of the present invention forms a "far edge" at the extreme border of the network (e.g., on the same local area network (LAN) or 5G cell as a user or edge device).

A key weakness of modern CDNs is that POPs are essentially islands of infrastructure. There is no intelligent network between nodes in a CDN-POP. Therefore, cache misses to a POP always result in origin fetches, even if another nearby CDN-POP already has a cached copy of the data. The CDN of the present invention is formed of not only data center POPs, but tiny points of presence deployed across an area (e.g., city). Nodes in the present invention cooperate intelligently as a network to overcome the limitations of modern CDNs and clouds. The nodes form a decentralized cache, eliminating origin prefetches when nearby nodes have copies of the data or fragments of the data.

Another problem in modern CDNs is the origin fetch itself. The further the origin server is from the CDN proxy, the higher the latency, and the longer it takes to establish a connection and retrieve data for a user. Advantageously, the nodes of the present invention are operable to cooperate to maintain a pool of persistent connections to as many other proxy nodes as reasonable, which are then operable to be used for proxy requests. The present invention uses a peer-to-peer network as a basis for the CDN to reduce latency and increase throughput in serving requests.

Nodes in the distributed edge computing platform (sometimes referred to as "EDJX nodes") are zero-configuration nodes, meaning the nodes are operable to acquire any configuration dynamically and on-the-fly from the ad-hoc environment. Consequently, all nodes are identical from a software stack and configuration point of view, removing the need for orchestration and configuration management. In a preferred embodiment, every node in the distributed edge computing platform is designed for zero-configuration and all nodes are essentially identical. In one embodiment, the distributed edge computing platform dynamically allocates and schedules resources based on individual node capabilities without operator intervention. Advantageously, this allows developers to focus on building critical functionality because there are no infrastructure dependencies or complex orchestration systems to manage.

Figure 2:
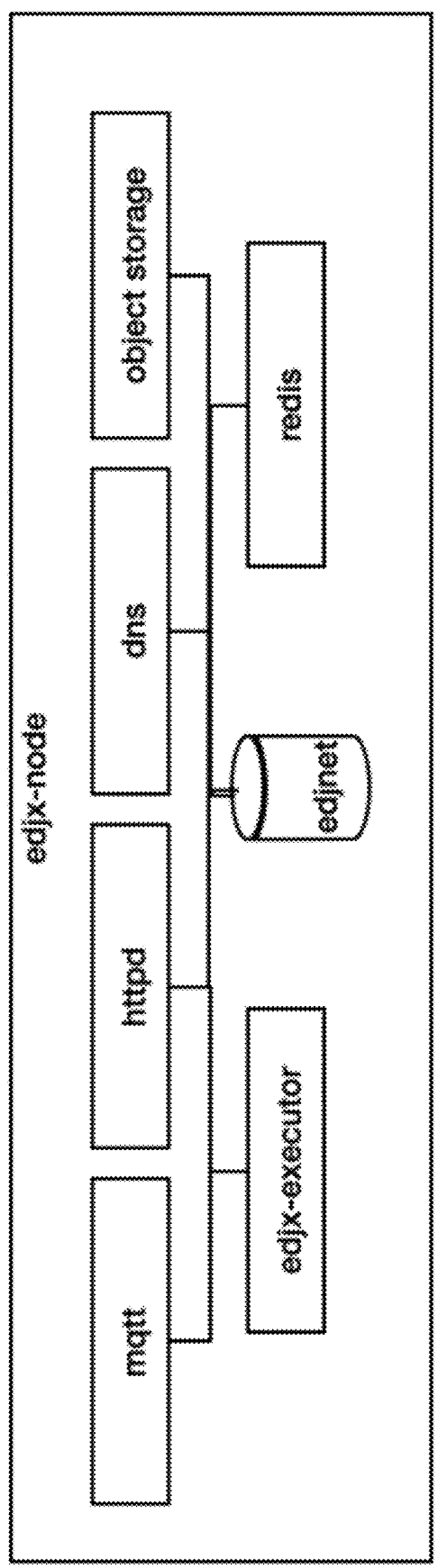
FIG. 2 illustrates one embodiment of a node according to the present invention.

Every node in the distributed edge computing platform exposes a number of protocol endpoints, based on network policy, to enable proximal cloud services: (1) HTTP and Hypertext Transfer Protocol Secure (HTTPS), (2) Message Queuing Telemetry Transport (MQTT), (3) Object Storage, and/or (4) Domain Name System (DNS). FIG. 2 illustrates one embodiment of a node including HTTP and HTTPS services on a web server (e.g., HTTPD), MQTT, object storage, and DNS. The node further includes a function executor service and a cache service (e.g., REDIS). The node preferably includes at least one database and a message bus.

HTTP and HTTPS services include, but are not limited to, request routing, rewriting, redirecting, and/or triggering serverless functions. The platform is preferably operable to perform proximity-based routing of HTTP and/or HTTPS requests to the closest content-addressed data network-enabled node. In one embodiment, the proximity-based routing is based on at least one proximity metric including, but not limited to, availability, performance, latency, and/or other criteria. In one embodiment, the platform is operable to create global rewrite rules to transparently rewrite uniform resource identifiers (URIs). In one embodiment, the platform is operable to create global redirect rules to transparently redirect URIs. In one embodiment, the platform is operable to trigger serverless functions based on HTTP request, URI, etc.

Object storage services include, but are not limited to, key-value storage, triggering serverless functions, durability, policies, and/or encryption. In one embodiment, the platform is operable to persist data using key-value storage under a single, global namespace over HTTP and HTTPS. In one embodiment, the platform is operable to trigger serverless functions based on creation, deletion, or updates to data objects. The platform preferably is operable to perform transparent and opportunistic replication of data ensuring durability through eventual consistency. In one embodiment, the platform controls access to data based on Identity and Access Management (IAM) policies which dynamically replicate. In one embodiment, the platform includes full end-to-end encryption of data in transit and at rest with optional encryption of payloads based on cryptographic identities tied to IAM policies. The platform preferably includes a log of where data originated, user(s) who have accessed the data, and how the data has changed over time.

Figure 3:
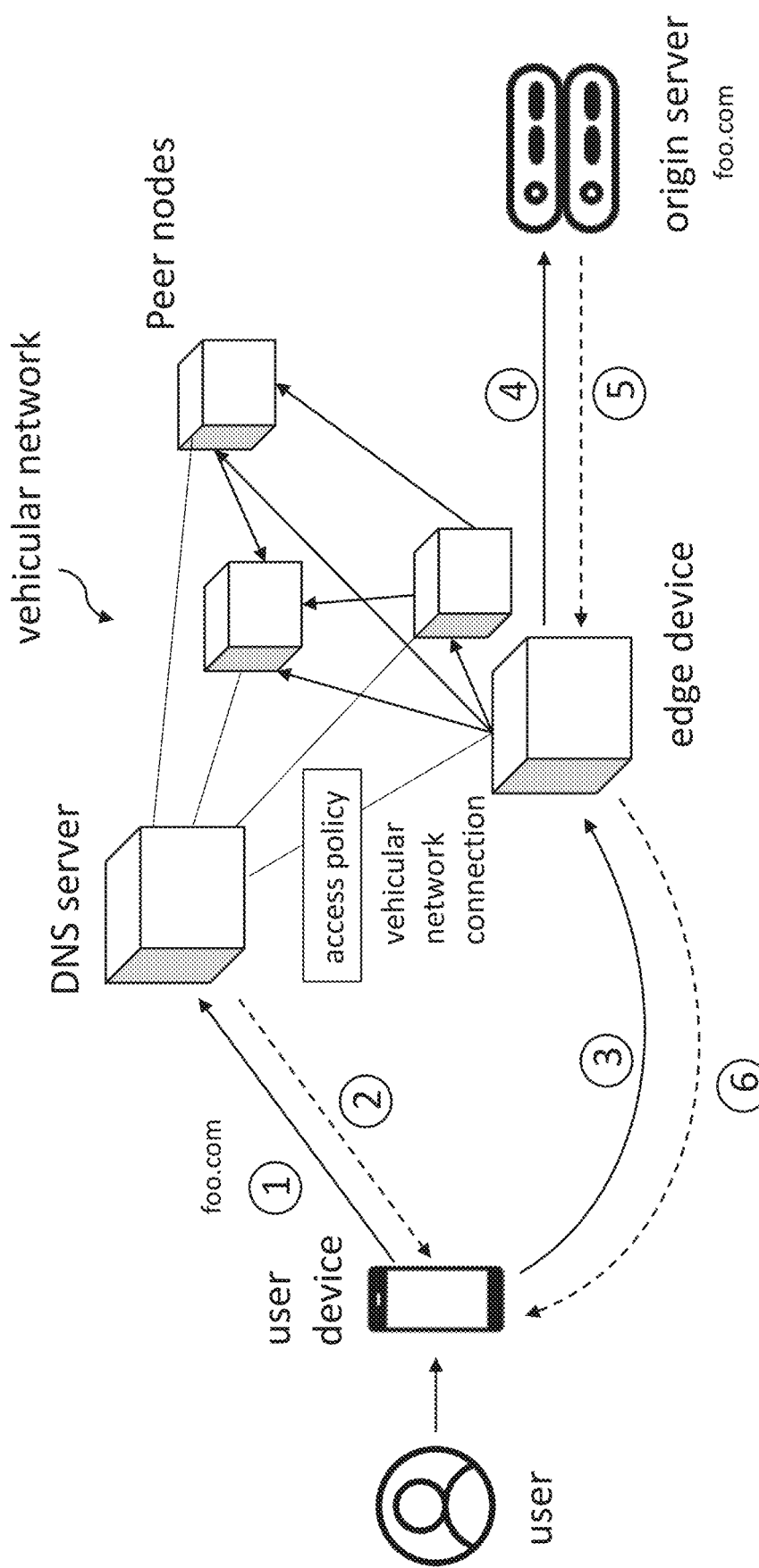
FIG. 3 illustrates one embodiment of the content delivery network.

As previously described, in one embodiment, the system provides a content delivery network as shown in FIG. 3. HTTP responses are cached at the edge of the network, which provides the responses faster and with lower latency and high bandwidth. A user enters a URI (e.g., foo.com) into a user device. The user device makes a DNS query to the URI (Step 1). In one embodiment, an administrator points the URI at least one DNS server. The at least one DNS server is operable to be on any node that is configured to be a DNS server. The DNS server geolocates an IP address of the user device to determine a nearest node. In one embodiment, the user device communicates the IP address directly to the DNS server. Alternatively, the IP address is communicated to the DNS server via an intermediary resolver, which includes a subnet for the user device. The nearest node is geographically proximal to the user device. An IP address for the nearest node is transmitted to the user device (Step 2).

The user device makes an HTTP connection to the nearest node (Step 3). The nearest node determines if the HTTP request is already in the cache or if the HTTP request is operable to be resolved using peer nodes. If the HTTP request is operable to be resolved by the nearest node (with or without the use of peer nodes), a response is returned to the user device (Step 6). If the HTTP request cannot be resolved by the nearest node, the content is fetched from the origin server (Step 4), cached (Step 5), and returned to the user device in near real time (Step 6).

Figure 4:
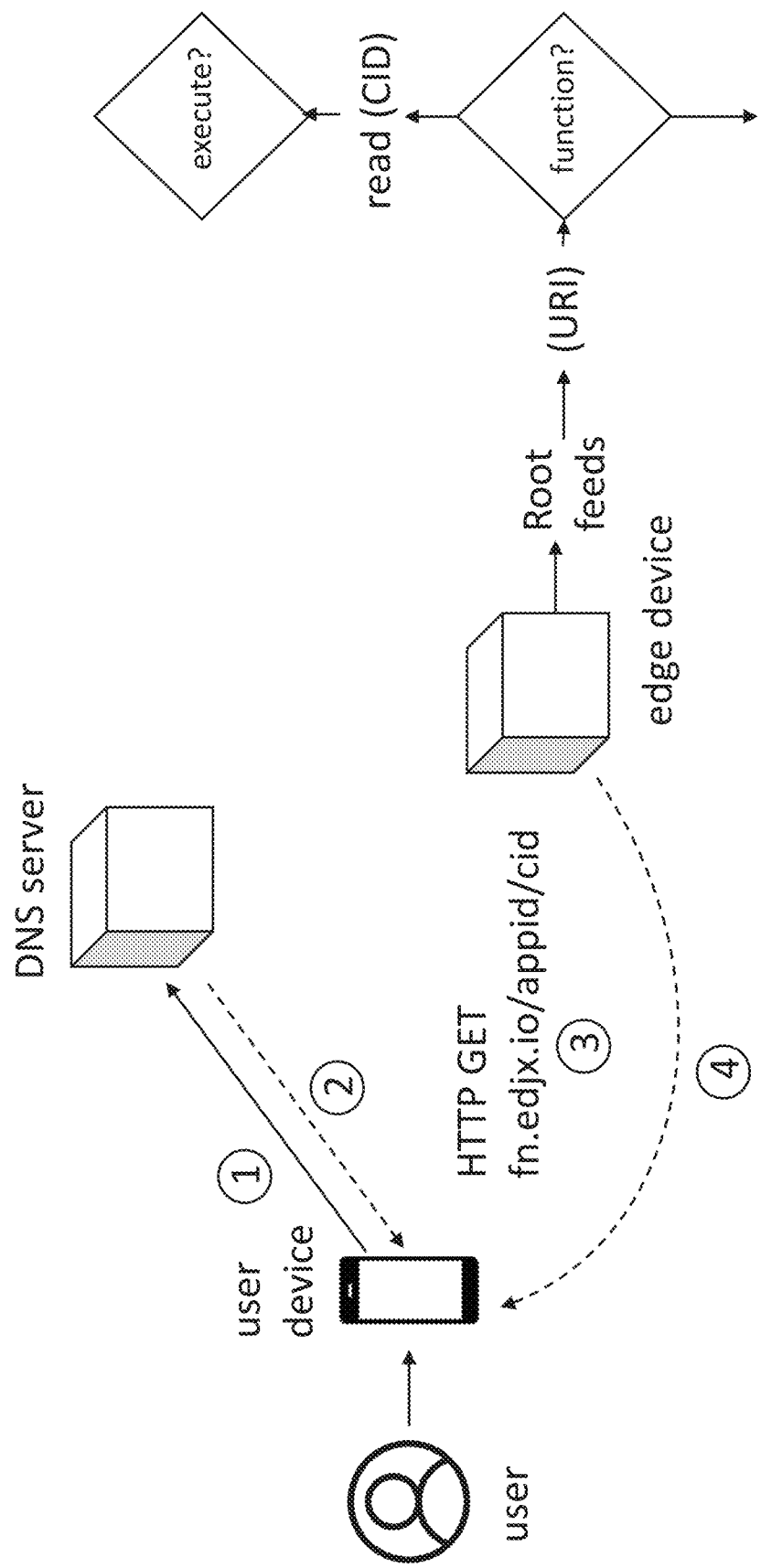
FIG. 4 illustrates one embodiment of executing a function using the present invention.

FIG. 4 illustrates one embodiment of executing a function using the present invention. The DNS server returns the nearest node as previously described. An HTTP request for the function is sent to the nearest node. The nearest node dereferences the CID, app ID, and URI using the root feeds. The nearest node determines the policy associated with the HTTP request. If the nearest node determines that a function should be executed, the nearest node determines if it has the root block locally or if it needs to fetch the root block and all of its children before it can execute the function. The nearest node loads the function into a secure execution environment running on the node and runs the function end to end. A result of the running the function end to end is written into the content-addressed data network as blocks.

DNS services include, but are not limited to, routing and/or delegating authority. In one embodiment, the platform responds to DNS requests using at least one DNS metric. In one embodiment, the at least one DNS metric includes, but is not limited to, geospatial proximity, performance, and/or availability. The platform is preferably operable to dynamically direct clients to edge nodes. In one embodiment, the platform is operable to delegate DNS authority to the content-addressed data network to disseminate DNS information and routing rules to the global network.

Content-addressed data network nodes coordinate dynamically to deliver cloud services at the far-edge of modern communication networks, across a range of hardware platforms (e.g., IoT, mobile, server, etc.). The content-addressed data network federates a diverse set of physical infrastructures to create a single, global data network, in which data is securely persisted and replicated with assured integrity. Working together, nodes on the distributed edge computing platform deliver cloud services over standard protocols and interfaces.

Advantageously, the distributed edge computing platform of the present invention provides increased responsiveness, improved agility, simplified operations and increased data integrity. The distributed edge computing platform enables proximal data processing and computation in order to reduce application latencies and increase responsiveness. Building decentralized applications with the distributed edge computing platform of the present invention enables near real-time data fusion and algorithms to work seamlessly across a plurality of connected devices.

Additionally, the distributed edge computing platform of the present invention helps developers build distributed applications at planet-scale. All serverless functions are stored on the content-addressed data network as content-addressed data blocks and opportunistically disseminated among the plurality of the content-addressed data network nodes. There is no software to deploy or maintain on edge computing nodes. As a result, deploying functions, cache purges, and/or rolling back or forward between versions of serverless functions are nearly instantaneous.

Neutral Host Cellular Network

The mobile edge platform nodes and the content delivery network of the present invention are operable to be used to create a neutral host cellular network. A neutral host network is carrier-independent in that each mobile edge platform node is operable to provide broadband and other wireless MNO services to a device regardless of which carrier the device uses. Advantageously, developing an effective neutral host cellular network eliminates the need for an individual MNO to create its own edge infrastructure for providing cellular services. Edge compute and access to the internet via a mobile edge platform node reduces dependency on the backhaul network and a cloud and/or local data center, thus reducing latency as well as costs associated with maintaining non-distributed networks and systems.

In one embodiment, the edge computing platform is operable to establish a private cellular network using at least one mobile edge platform node. In one embodiment, the private cellular network is a Long-Term Evolution (LTE) network. Alternatively, the private cellular network is a 4G/5G network, thus taking advantage of 5G low latency. Network protocols beyond 5G are also compatible with the present invention. In one embodiment, the private cellular network is a standalone network (e.g., a 5G network) and does not have legacy network (e.g., 4G LTE network) dependencies. Alternatively, the private cellular network is non-standalone and includes both 5G and 4G LTE infrastructure. A private 4G/5G network has advantages over a WI-FI network. WI-FI networks are susceptible to congestion and interference, and have shorter ranges than private 4G/5G networks. In addition, private 4G/5G networks use security protocols adapted from wireless cellular networks, e.g., subscriber identification module (SIM)-based security, which can be more secure than WI-FI networks. Private 4G/5G networks are especially advantageous when large amounts of data are continuously transported across the network, for example in facilities with many Internet of Things (IoT) devices that are continuously collecting and analyzing data. Private 4G/5G networks also enable more stable and secure video surveillance systems or video-as-a-sensor systems.

Enabling edge computing and a content delivery network on a private cellular network (e.g., private 4G/5G network) further improves the private cellular network by reducing latency for compute services and internet access in a consolidated edge platform mobile node infrastructure. Additionally, the private cellular network is operable to be customized according to the security and latency needs of an organization. The organization includes but is not limited to a hospital, a port, an airport, a factory, a mine, a manufacturing facility, a shipping facility, an office center, a campus, a stadium, a business, a shopping center, a performance venue, a smart city, a public space, and/or a location with a population density above a set threshold for a set period of time.

The private cellular network (e.g., private 4G/5G network) is implemented via at least one mobile edge platform node wherein the at least one mobile edge platform node functions as an access node for internet and radio access, an edge compute node, and/or a content delivery network node. In one embodiment, the private cellular network uses georouting for locating edge nodes to reduce latency. The at least one mobile edge platform node is preferably a neutral host in that it is carrier independent. As previously addressed, the at least one mobile edge platform node is operable for internet access and packet processing directly at the edge, thus eliminating the need to send packets through the backhaul network of a specific MNO. In an embodiment wherein the private cellular network is implemented on a plurality of mobile edge platform nodes, the edge computing platform is operable to synchronize the plurality of mobile edge platform nodes. In one embodiment, the plurality of mobile edge platform nodes is operable to support precision time protocol (PTP) for accurate synchronization. The edge computing platform is operable to establish a private cellular network (e.g., private 4G/5G network) on licensed, unlicensed, and/or shared spectrum. In one embodiment, the private cellular network (e.g., private 4G/5G network) co-exists with a WI-FI network and/or other cellular networks.

Advantageously, the use of the mobile edge platform node as a neutral host allows any MNO to use the private cellular network (e.g., private 4G/5G network). In addition, any MNO can deliver content through the CDN established by the edge computing platform and the mobile edge platform nodes on the private cellular network. The edge computing platform is operable to allow access to an MNO through a standard S1 interface.

In one embodiment, the edge computing platform implements configurable quality of service (QOS) protocols to create multiple layers of prioritization in the private cellular network. In one embodiment, the QoS protocol includes a sensing function, a processing function, and an acting function as described in U.S. Patent Publication No. 2020/0244547, filed Oct. 10, 2019, which is incorporated herein by reference in its entirety. The sensing function includes a sensing application on the device wherein the sensing application is operable to be accessed via an API call. The sensing application is operable to detect sensing data including signal strength, content delivery network metrics, and/or other network parameters in real time or near real time. The sensing function is then operable to send the sensing data to the processing function. In one embodiment, the processing function is executed by the edge computing platform. Alternatively, the processing function is operable to be executed on the mobile edge platform node. The processing function includes but is not limited to authenticating the device, analyzing network conditions, and/or determining the compute and/or resource needs of the current session of the device. The acting function is executed by the edge computing platform by initiating a request for service conditions from a mobile edge platform node. In one embodiment, the mobile edge platform node is the nearest node to the edge device as determined by georouting. In another embodiment, the request for service conditions, e.g., for additional bandwidth, is made to a policy server. Alternatively, the request for service conditions is a recommended transport bit rate as described in U.S. Patent Publication No. 2020/0084257, filed Nov. 14, 2019, which is incorporated herein by reference in its entirety. The mobile edge platform node then delivers the requested service conditions. In one embodiment, the mobile edge platform node is operable to perform base station node functions in order to deliver the requested service conditions. In another embodiment, the mobile edge platform node is operable for cellular handover to a second mobile edge platform node.

In one embodiment, the mobile edge platform nodes are monitored as described in U.S. Patent Publication No. 2018/0376358, filed Jun. 19, 2018, which is incorporated herein by reference in its entirety. Advantageously, the sensing function on the device itself means that the request for service conditions is only made when immediately necessary and that the request is specific to a device and a session. The solution provides for Quality of Service improvement to mobile subscribers by setting up a dedicated bearer to the user in the last mile, ensuring that sufficient bandwidth is available and guaranteed, enhancing customer experience.

In one embodiment, the private cellular network (e.g., private 4G/5G network) includes a virtual private cellular network (e.g., virtual private 4G/5G network). A virtual private cellular network is useful when an organization has multiple sites and requires that mobile devices that move between the sites connect and reconnect to the same private cellular network. In one embodiment, the edge computing platform is operable for virtualization and network slicing. In one embodiment, the edge computing platform is operable for dynamic network slicing as described in U.S. Pat. No. 10,841,399, filed Oct. 3, 2019 and issued Nov. 17, 2020, which is incorporated herein by reference in its entirety. In one embodiment, a slice of a cellular network is operable to selectively access a mobile edge platform node.

In one embodiment, the edge computing platform is operable to authenticate devices accessing the private cellular network. The devices include, but are not limited to, a computer, a tablet, a mobile phone (e.g., a smartphone), a wearable, a camera, a sensor (e.g., a temperature sensor, a humidity sensor, a scale, a motion sensor), a tracker, a smart appliance, a vehicle (e.g., a commercial vehicle, an industrial vehicle), heavy equipment, and/or machinery. The edge computing platform is operable to implement at least one access policy on the private cellular network.

In one embodiment, a mobile edge platform node is operable to register and authenticate a device when the device requests wireless services from the mobile edge platform node. In one embodiment, the registration and authentication are automatic. After registering the device, the mobile edge platform node is operable to determine which MNO services the device and access an MNO account associated with the device. The mobile edge platform node is then operable to track the wireless services used by the device and bill the associated MNO account accordingly. Multiple billing schemes for each MNO are operable to be implemented on the mobile edge platform node simultaneously. The mobile edge platform node is further operable to share account information and/or usage information with other edge platform nodes. In one embodiment, the mobile edge platform node is operable to implement overdraft protection for an MNO account. In another embodiment, the mobile edge platform node is operable to deny a mobile device from accessing wireless services based on the associated MNO account.

Evolved Packet Core

The edge computing platform of the present invention is operable to establish an Evolved Packet Core (EPC) architecture for LTE and/or 5G NR wireless broadband communications when creating a wireless network. Alternative EPC architectures beyond 5G are also compatible with the present invention. EPC is a flat architecture with certain node functions and subcomponents including but not limited to a mobile management entity (MME), a home subscriber server (HSS), a serving gateway (SGW), a packet data network gateway (PGW), a policy and charging rules function (PCRF), and an access network discovery and selection function (ANDSF). In one embodiment, a mobile edge platform node is operable to perform at least one of the EPC node functions. Advantageously, pushing the EPC to the edge eliminates the need to transport packets through the backhaul network to an EPC of a specific MNO, thus reducing latency and providing accelerated content delivery. In addition, incorporating the EPC on the mobile edge platform node provides enhanced mobile coverage. In one embodiment the control plane and the user plane of the EPC are disaggregated, allowing rapid dissemination of Platform Nodes and complete control of data paths by the edge computing platform. The control plane includes in one embodiment radio-specific functionality which depends on the connection state of the user device and/or the mobile edge platform node. The user plane includes packet data convergence protocol (PDCP), radio link control (RLC), and/or medium access control (MAC). The user plane is operable for tunneling protocols including but not limited to GPRS tunneling protocol (GTP). In one embodiment, the EPC is integrated into the platform node at the user plane and the user plane functions are deployed to platform nodes. The platform nodes interface with the base station node radio hardware and software. In one embodiment, the neutral host platform node and the EPC of the edge computing platform interface with the EPC of the MNO through a standard S1 interface. The interface between the MNO EPC and the edge computing platform EPC allows for authentication of subscribers as well as policy management of data traffic. In one embodiment, quality of service and delivery occur locally at each mobile edge platform node.

Federated Network

The edge computing platform of the present invention is further operable to create a neutral host public cellular network (e.g., neutral host public 4G/5G network) along with the private cellular network (e.g., private 4G/5G network) wherein the mobile edge platform nodes that are used to create the private cellular network are also operable to provide a public cellular network (e.g., public 4G/5G network) to devices. Advantageously, implementing a public cellular network and a private cellular network on the same mobile edge platform nodes extends the far edge and increases access to edge computing, wireless services, and the content delivery network. MNOs do not have to invest in software or hardware infrastructure to extend coverage of their wireless services because the public cellular network of the present invention is carrier-independent and can be accessed by any device. The edge CDN infrastructure of the present invention also allows a plurality of MNOs to deliver content through the edge CDN using the same mobile edge computing platform node. In one embodiment, the private cellular network and the public cellular network have the same area of coverage.

The edge computing platform of the present invention is operable to determine whether a device has access to the private cellular network or the public cellular network. In one embodiment, the access is based on location. For example, a private cellular network is established inside a building and a public cellular network is established outside the building. Devices of passerby who walk past the building are granted access to the public cellular network created from the same mobile edge platform node. Devices that are located inside the building, e.g., a security camera, are connected to the private cellular network. In another embodiment, access to the private cellular network and/or the public cellular network is based on at least one access policy. For example, devices registered to employees in the building are granted access to the private cellular network while unregistered devices are granted access to the public cellular network. In another embodiment, only devices that can access the private cellular network are able to access the public cellular network. In one embodiment, the at least one access policy is operable to be established by a network operator. Alternatively, the at least one access policy is operable to be established by an administrator, e.g., a building manager.

Figure 5:
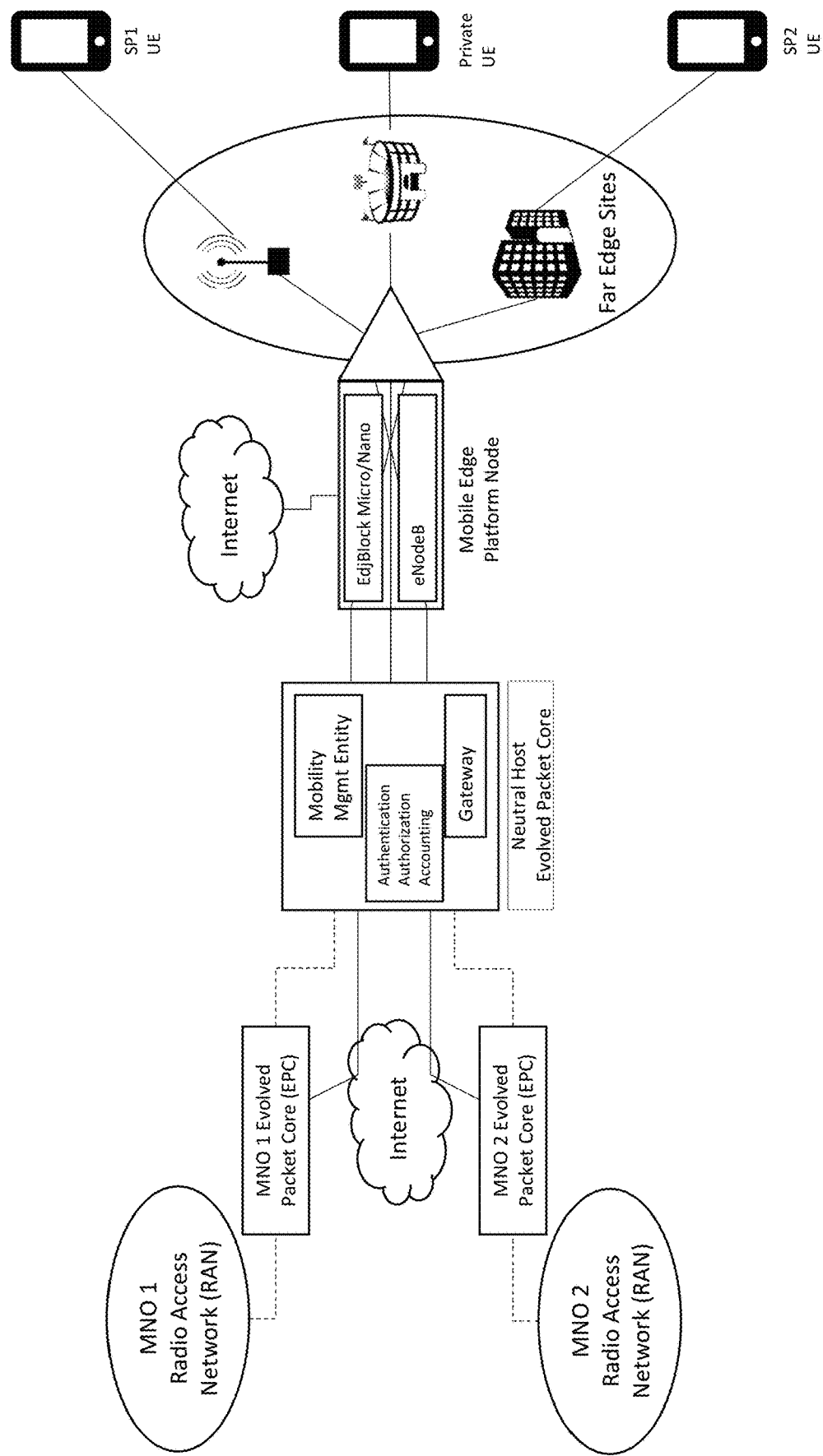
FIG. 5 illustrates one embodiment of the present invention creating a multi-access edge computing network.

FIG. 5 illustrates one embodiment of the present invention wherein the mobile edge platform node provides network access to user devices across two different mobile network operators. The mobile edge platform node also creates a private cellular network for private user equipment. The mobile edge platform node is directly connected to the internet and is thus operable to provide internet services to private and public cellular networks (e.g., private and public 4G/5G networks) with lower latency and without using the backhaul network. In addition, the evolved packet core (EPC) of the present invention is a neutral host EPC and is operable to access a plurality of different MNOs simultaneously. In this embodiment, the MNO EPC interfaces with the neutral host EPC through a standard S1 interface. The user plane functions of the EPC are deployed to the mobile edge platform node.

In one embodiment, the public cellular network (e.g., public 4G/5G network) allows for roaming, whereby a device is operable to access the public cellular network via a roaming carrier if the carrier for the device is not delivering services through the public cellular network. The mobile edge platform node is operable to recognize when a device is roaming. In another embodiment, the private cellular network is also operable for roaming (e.g., private 4G/5G network). The edge computing platform is operable to implement security and access policies such that sensitive data stored on the CDN of the private cellular network are protected from being accessed by unauthorized mobile devices. In one embodiment, the private cellular network includes a whitelist of authorized mobile devices. In another embodiment, all devices connected to the mobile edge platform node and the EPC are subject to the complete security framework of the relevant 3GPP standards.

Figure 6:
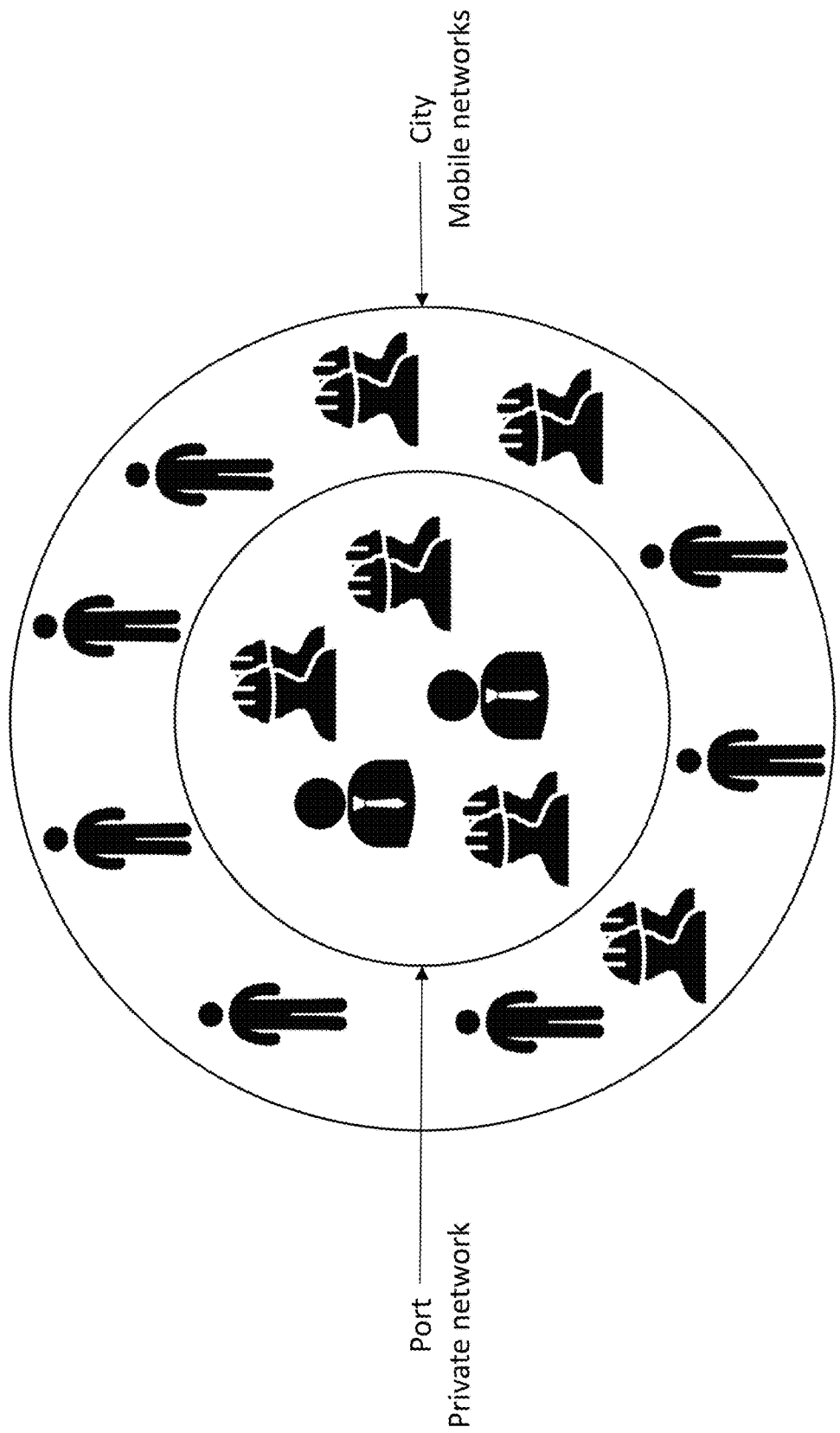
FIG. 6 illustrates one implementation of the multi-access edge computing network of the present invention.

A non-limiting implementation of the private cellular network (e.g., private 4G/5G network) and the public cellular network (e.g., public 4G/5G network) is at a port. A port serves many functions, including as a dock for cargo shipments, cruise/passenger ships, and individual watercraft. In addition, a port may include a marina with various commercial establishments (e.g., restaurants, retail services), which is a popular destination for visitors who expect accessible wireless services. Freight companies need to keep track of cargo shipments passing through a port and deploy a number of devices to do so, including, but not limited to, smartphones, computers, tablets, IoT sensors, video cameras, and/or scanners. The data from these devices is continuously updated and shared between devices and users to streamline the tracking and processing of cargo. The edge computing platform of the present invention is operable to establish a private cellular network for the port staff and visitors using at least one mobile edge platform node. The private cellular network can be illustrated as an "inner ring." The at least one mobile edge platform node acts as a radio node for network access (e.g., 4G/5G network access), an edge computing node, and a content delivery network node. The private cellular network provides higher speeds, lower delays, and guaranteed quality to devices associated with port staff and visitors. The private cellular network is also operable to host a variety of applications, including but not limited to port navigation, warehouse logistics and automation, facility and machinery management, lorry fleet management, and emergency services. The private cellular network is configured such that the visitors to the port only have access to certain applications, e.g., navigation and emergency services, while the staff of the port have access to additional applications, e.g., warehouse logistics and facility management. In one embodiment, the edge computing platform establishes different network slices in the private cellular network for each port stakeholder (e.g., shop owners, administration, operators). The same at least one mobile edge platform node that establishes the private cellular network is also operable to establish a public cellular network in the city surrounding the port. The public cellular network can be illustrated as an "outer ring." The public cellular network is accessible to port staff in the city and provides the same advantages of the private cellular network. In one embodiment, a device is further able to roam onto the inner ring for coverage via the MNO of the device. FIG. 6 illustrates this embodiment of the inner ring private cellular network and the outer ring public cellular network. The inner ring is a private cellular network and is available to the port, including employees. The employees of the port also have access to the outer ring wherein the outer ring is a mobile network in the city surrounding the port.

An alternative non-limiting implementation of the private cellular network and the public cellular network is in a hospital. At least one mobile edge platform node establishes a private cellular network in the hospital wherein the private cellular network is only accessible by devices in the hospital's IT system. Advantageously, the at least one mobile edge platform node is operable to implement data privacy and security protocols in order to prevent breaches of the Health Insurance Portability and Accountability Act (HIPAA) and other compliance issues. For example, the at least one mobile edge platform node is operable to implement a blacklist filter on the internet services to blacklist websites that are likely to contain viruses or other threats to data privacy. As another non-limiting example, the at least one mobile edge platform node is operable to encrypt medical data before performing edge compute services. The at least one mobile edge platform node is also operable to establish a public cellular network in the hospital wherein the public cellular network is accessible by any devices in the hospital. Thus, patients, visitors, and hospital staff with personal devices are only able to access the public cellular network while the hospital devices that are used for storing and updating medical data are able to access the private cellular network.

Yet another alternative non-limiting implementation of the private cellular network and the public cellular network is in supply chain management. Internet of Things (IoT) devices are placed on base materials, individual components, equipment and machinery, products, packaging, shipping containers, and/or vehicles to label and identify each item. A facility such as a warehouse is also equipped with IoT sensors such as video cameras, smart gateways, and/or scanners that record the location and movement of IoT devices throughout the facility. The IoT sensors are also operable to detect defects, breakdowns, and/or status updates. This system helps businesses accurately track their products and capture the full supply chain, as well as identify delays and issues easily. As a result, businesses are able to accurately estimate capacity, volume, and transportation timelines to ensure that all product demands are met. IoT devices and IoT sensors that run continuously generate large amounts of data that must be processed, analyzed, and stored in order to serve as an effective automated system. Edge computing allows these functions to be performed closer to the IoT devices and sensors, thus reducing latency and dependency on a centralized data server. In one embodiment, the edge computing platform of the present invention establishes a private cellular network (e.g., private 4G/5G network) using at least one mobile edge platform node located in a warehouse. The IoT devices and the IoT sensors used to track the products manufactured and shipped from the warehouse connect to the private cellular network. Processing and analysis of the data from the IoT devices and the IoT sensors is done by the at least one mobile edge platform node. The at least one mobile edge platform node also provides internet access and the content delivery network to any of the devices in the factory based on at least one access policy. The at least one mobile edge platform node also creates a public cellular network (e.g., public cellular network) in the area surrounding the factory. Internet access and the content delivery network are available through the public cellular network of the at least one mobile edge platform node to devices that are not granted access to the private cellular network. The devices on the public cellular network are not able to view the IoT devices and the IoT sensors on the private cellular network.

Intelligent Transportation System

In one embodiment, the edge computing platform of the present invention includes an intelligent transportation system. The intelligent transportation system includes, but is not limited to, a plurality of sensors and/or a plurality of vehicles. The intelligent transportation system is preferably operable to utilize the distributed edge computing platform, the private network (e.g., private cellular network), and/or the public network (e.g., public cellular network) of the present invention to monitor, analyze, predict, and/or manage traffic, parking, infrastructure, and/or roads. The intelligent transportation system is operable to provide functions including, but not limited to, car navigation, traffic signal control systems, signage (e.g., variable message signing), automatic license plate recognition, speed detection, automatic detection of accidents, automatic detection of stopped vehicles, parking guidance and information systems, toll systems, emissions and/or air quality monitoring, emergency services support, traffic reduction, weather information, and/or weatherproofing (e.g., ice removal or prevention).

The intelligent transportation system is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The intelligent transportation system is operable to use any of the aforementioned learning techniques alone or in combination.

Further, the intelligent transportation system is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The intelligent transportation system is preferably operable to recommend and/or perform actions based on historical data, external data sources, ML, AI, NNs, and/or other learning techniques. The intelligent transportation system is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

In one embodiment, the present invention incorporates floating car data (FCD). The floating car data preferably includes, but is not limited to, a timestamp, a geolocation, and/or speed data. In one embodiment, the floating car data incorporates floating cellular data from a cellular network (e.g., CDMA (Code Division Multiple Access), GSM (Global System for Mobiles), UMTS (Universal Mobile Telecommunications System), GPRS (General Packet Radio Service), OFDMA (Orthogonal Frequency-Division Multiple Access)). In one embodiment, the floating car data includes at least one Media Access Control (MAC) address (e.g., from a BLUETOOTH device) and/or using a radio-frequency identification (RFID) serial numbers from a transponder (e.g., toll tag). In another embodiment, the floating car data includes location data (e.g., Global Positioning System (GPS) data).

The plurality of sensors includes, but is not limited to, a motion sensor for detecting movement (e.g., infrared sensor, ultrasonic sensor, light detection and ranging (LIDAR), radio detection and ranging (RADAR)), an acceleration sensor for detecting acceleration, an electromagnetic sensor for detecting electromagnetic waves (e.g., radiofrequency signals), a location sensor (e.g., global positioning system (GPS) sensor) for determining location, a sound sensor for determining a sound and/or a sound level, a camera (e.g., video, still image) for capturing at least one image, a temperature sensor for measuring air temperature, a humidity sensor for detecting air humidity, an object sensor (e.g., infrared sensor, ultrasonic sensor, motion sensor, inductive or capacitive sensor, Hall sensor, LIDAR, RADAR) for detecting an object (e.g., person, animal, vehicle), an air pressure sensor to detect air pressure (e.g., static air pressure from weather conditions, dynamic air pressure from passing vehicles and/or wind), a precipitation sensor for detecting precipitation, an anemometer for detecting wind speed, a light sensor for detecting ambient light and/or headlights, an air quality sensor to detect air quality, a chemical sensor for detecting chemicals (e.g., salt), an ammeter for measuring current, a voltmeter for measuring voltage, a power meter for measuring power, a magnetic field sensor for detecting a magnetic field (e.g., loop detector that determines changes based on moving vehicles), an orientation sensor for determining an orientation (e.g., of one or more of the plurality of sensors), and/or an acceleration sensor for detecting acceleration.

In one embodiment, one or more of the plurality of sensors are included on a printed circuit board (PCB). In one embodiment, one or more of the plurality of sensors and/or the PCB is incorporated into a housing. In one embodiment, one or more of the plurality of sensors, the PCB, and/or the housing is secured to a traffic pole, a light pole, a building wall or roof, a crash barrier, a reflector post, a snow pole, a concrete guidance wall, and/or a soundproof wall. In another embodiment, one or more of the plurality of sensors, the PCB, and/or the housing is enclosed in a traffic signal cabinet.

In a preferred embodiment, each of the plurality of sensors is operatively connected to at least one power source (e.g., battery, solar cell, alternating current (AC) power). In one embodiment, each of the plurality of sensors is operatively connected to at least one communications interface (e.g., 3G, 4G, 5G, BLUETOOTH®, ZIGBEE, etc.). The at least one communications interface is preferably operable to transmit sensor data from each of the plurality of sensors to at least one server node.

In one embodiment, one or more of the plurality of sensors is incorporated into or otherwise attached to a vehicle. In one embodiment, the vehicle includes, but is not limited to, an automobile, a truck, a bus, a sport utility vehicle (SUV), a motorcycle, and/or a moped. In one embodiment, the vehicle is an autonomous vehicle or a semi-autonomous vehicle. In another embodiment, the vehicle is an unmanned vehicle (e.g., an unmanned aerial vehicle (UAV)). Additionally or alternatively, one or more of the plurality of sensors is incorporated into a mobile device (e.g., smartphone).

The intelligent transportation system utilizes the distributed edge computing platform, the private network (e.g., private cellular network), and/or the public network (e.g., public cellular network) of the present invention to facilitate data collection and/or processing. Advantageously, collecting and processing data at the edge reduces latency. This reduction in latency improves a response time to a change in data (e.g., accident, weather, etc.). For example, processing data at the edge reduces a response time necessary to notify a vehicle and/or a driver to slow the vehicle down or stop.

Figure 7:
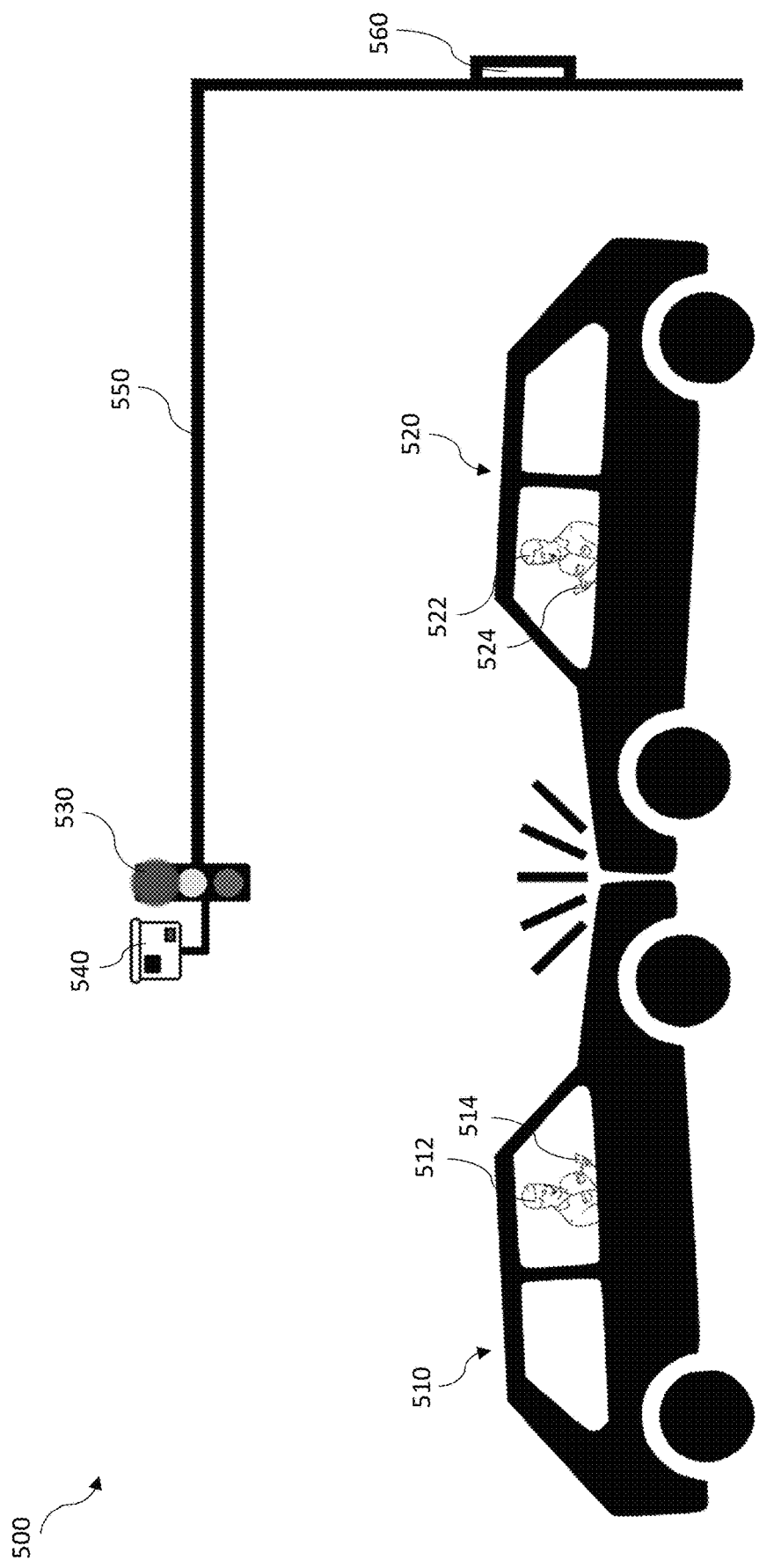
FIG. 7 illustrates an example of a car accident scene with at least one node.

Advantageously, the intelligent transportation system is operable to reconstruct a historical event (e.g., a car accident) using data from the plurality of sensors. FIG. 7 illustrates an example of a car accident scene 500 with at least one node 560. A first car 510 driven by a first driver 512 includes a plurality of sensors (e.g., tire sensors, temperature sensors, capacitive sensors, etc.). The first driver 512 has a first cell phone 514. In one embodiment, the first driver 512 is wearing at least one first wearable device (e.g., FITBIT, APPLE WATCH, SAMSUNG GALAXY WATCH, OURA RING) measuring at least one first biological signal (e.g., heart rate, respiratory rate, galvanic stress, sleep state). In one embodiment, at least one passenger in the first car 510 has at least one first passenger cell phone and/or at least one first passenger wearable device. A second car 520 driven by a second driver 522 includes a plurality of sensors (e.g., tire sensors, temperature sensors, capacitive sensors, etc.). The second driver 522 has a second cell phone 524. In one embodiment, the second driver 522 is wearing at least one second wearable device (e.g., FITBIT, APPLE WATCH, SAMSUNG GALAXY WATCH, OURA RING) measuring at least one second biological signal. In one embodiment, at least one passenger in the second car 520 has at least one second passenger cell phone and/or at least one second passenger wearable device.

In one embodiment, the accident scene 500 includes at least one traffic light 530 and/or at least one camera 540. In one embodiment, one or more of the at least one traffic light 530 and/or the at least one camera 540 is mounted on a traffic pole 550. In one embodiment, one or more of the at least one camera 540 is mounted in (e.g., on a dashboard) the first car 510 and/or the second car 520. Additionally or alternatively, one or more of the at least one camera 540 is mounted on a building. In the embodiment shown in FIG. 7, one of the at least one node 560 is mounted on the traffic pole. Alternatively, the at least one node 560 is mounted on a building (e.g., on a roof), in or on a light pole, or in a freestanding box.

The node 560 is operable to receive data from the plurality of sensors in the first car 510, the first cell phone 514, the at least one first wearable device, the at least one first passenger cell phone, the at least one first passenger wearable device, the plurality of sensors in the second car 520, the second cell phone 524, the at least one second wearable device, the at least one second passenger cell phone, the at least one second passenger wearable device, the at least one traffic light 530, and/or the at least one camera 540 in real time and/or in near-real time. Advantageously, the data allows the accident scene 500 to be reconstructed to determine how the accident happened. This ability to reconstruct the accident scene 500 is important as cars include more sensors and/or drive autonomously.

The intelligent transportation system further includes V2X (vehicle-to-everything) communication between a vehicle and a plurality of sources. In one embodiment, the V2X communication includes, but is not limited to, V2I (vehicle-to-infrastructure) communication, V2N (vehicle-to-network) communication, V2V (vehicle-to-vehicle) communication, V2P (vehicle-to-pedestrian) communication, V2D (vehicle-to-device communication), and/or V2G (vehicle-to-grid) communication. The V2X communication is facilitated by the at least one server node. In one embodiment, the intelligent transportation system utilizes the distributed edge computing platform, the private network (e.g., private cellular network), and/or the public network (e.g., public cellular network) of the present invention to facilitate the V2X communication.

In one embodiment, the V2I communication includes communication between a vehicle and at least one infrastructure component. In one embodiment, the at least one infrastructure component includes, but is not limited to, at least one traffic light, at least one road sign, at least one bridge, at least one reader (e.g., radiofrequency identification (RFID) reader), at least one sensor (e.g., camera), and/or at least one lane marker. Advantageously, the V2I communication is operable to provide real-time advisories regarding travel including, but not limited to, road conditions, traffic congestion, accidents, construction zones, and/or parking availability.

In one embodiment, the V2N communication is operable to provide communications between a vehicle and a network (e.g., the Internet, a cellular network). In one embodiment, the V2N communication is operable to provide entertainment, maps, routing, advertisements (e.g., gas, food, lodging), and/or discounts (e.g., food, lodging, entertainment). The V2N communication of the present invention is preferably operable to provide communications between a vehicle and a nearest server node, a private network, and/or a public network.

In one embodiment, the V2V communication is operable to provide electronic brake lights, electronic turn signals, platooning, traffic information systems, road transportation emergency services, and/or on-the-road services. The V2V communication preferably includes information about a vehicle including, but not limited to, a location, a heading, and/or a speed. The information about the vehicle is preferably communicated to nearby vehicles. In another embodiment, the V2V communication forms a Vehicular Ad Hoc Network (VANET).

In one embodiment, the V2P communication is operable to provide for communication between a vehicle and at least one pedestrian. In one embodiment, the V2P communication preferably includes information about the vehicle including, but not limited to, a vehicle location, a vehicle heading, and/or a vehicle speed. In another embodiment, the V2P communication includes information about the at least one pedestrian including, but not limited to, a pedestrian location, a pedestrian heading, and/or a pedestrian speed. For example, the V2P communication is operable to send a notification to a device (e.g., smartphone) of the at least one pedestrian that the vehicle is approaching. In another example, the V2P communication is operable to send a notification to a vehicle that the at least one pedestrian is approaching.

In one embodiment, the V2D communication is operable to provide for communication between a vehicle and at least one device (e.g., a smartphone, parking meter). In one embodiment, the at least one device is associated with a cyclist. In another embodiment, the at least one device is associated with the vehicle.

In one embodiment, the V2G communication is operable for plug-in electric vehicles to charge and/or provide power to an electric power grid (e.g., for demand response). In one embodiment, information regarding charging, power consumption, and/or providing power is transmitted from a charging station to a nearest node of the at least one server node.

The intelligent transportation system is operable to provide a model and/or a prediction of traffic. In one embodiment, the model and/or the prediction is based on data from the plurality of sensors and/or the floating car data. In a preferred embodiment, the model and/or the prediction incorporates historical data. For example, and not limitation, the model and/or the prediction incorporates trends from traffic at 5 PM on weekdays, holidays, events (e.g., concerts, sporting events), etc. The model and/or the prediction is preferably generated in real time and/or near real time.

The intelligent transportation system is preferably operable to provide traffic management control. In one embodiment, the traffic management control is based on the model and/or the prediction generated by the intelligent transportation system. The intelligent transportation system is operable to detect congestion, and dynamically make adjustments to manage traffic. In one embodiment, the intelligent transportation system is operable to manage at least one traffic signal and/or at least one pedestrian signal. The at least one traffic signal includes, but is not limited to, a green light, a yellow light, a red light, a reversible lane light, and/or a directional light (e.g., turn light). The pedestrian signal includes, but is not limited, to a walk signal and/or a stop signal. In another embodiment, the intelligent transportation system is operable to manage on-ramp signals, speed limits (e.g., dynamic signs), and/or lane management (e.g., bus lanes, high occupancy vehicle (HOV) lanes). Advantageously, the intelligent transportation system is operable to use the information (e.g., license plate data, vehicle data, sensor data, radiofrequency data, image data, audio data, video data, weather data, and/or traffic data) to set variable speed limits and/or adjust traffic signal phase and timing (SPaT) to increase traffic capacity and/or fuel economy.

In one embodiment, the intelligent transportation system is operable to route traffic to avoid and/or alleviate congestion. For example, the intelligent transportation system is operable to send a signal to a vehicle and/or a device (e.g., smartphone) to alter a route of the vehicle to avoid and/or alleviate congestion. The intelligent transportation system is also operable to provide an alternate route to the vehicle and/or the device that optimizes travel time while also alleviating congestion. In another embodiment, the intelligent transportation system is operable to propose at least one schedule and/or at least one route for vehicle movement for a plurality of vehicles in order to avoid and/or alleviate congestion.

The intelligent transportation system is preferably operable to provide traffic management due to at least one emergency. In a preferred embodiment, the intelligent transportation system is operable to prioritize access to roadways to emergency services (e.g., police, fire, ambulance). In one embodiment, the intelligent transportation system is operable to change at least one traffic signal to allow at least one emergency vehicle to pass due to the at least one emergency. For example, the intelligent transportation system changes four traffic lights between an accident scene and a hospital to green to allow an ambulance to pass. The intelligent transportation system is further operable to provide a notification about the at least one emergency and/or re-route traffic around the at least one emergency.

The intelligent transportation system is preferably operable to capture, store, and/or analyze information including, but not limited to, license plate data, vehicle data, sensor data, radiofrequency data, image data, audio data, video data, weather data, and/or traffic data (e.g., traffic volume). The intelligent transportation system is preferably operable to interface with third party databases. In one example, the intelligent transportation system is operable to interface with a vehicle registration database. In another example, the intelligent transportation system is operable to interface with a driver's license database (e.g., for facial identification of a driver).

In a preferred embodiment, the information is transmitted to a nearest node of the at least one server node. The nearest node is operable to process the information, thereby created analyzed data. The analyzed data includes, but is not limited to, license plate data, vehicle data, sensor data, radiofrequency data, image data, audio data, video data, weather data, and/or traffic data. In one embodiment, the nearest node is operable to transmit the information and/or the analyzed data to another node of the at least one server node and/or a cloud server.

The intelligent transportation system is preferably operable to provide a warning, a notification, an alarm, and/or an alert based on an event and/or a state. In one embodiment, the intelligent transportation system is operable to provide a visual warning (e.g., sign with text, at least one light emitting diode (LED)) and/or an auditory warning (e.g., tone). In one embodiment, the warning, the notification, the alarm, and/or the alert is provided to a vehicle, a person (e.g., driver, passenger, pedestrian, cyclist, etc.), an emergency responder, a maintenance worker, and/or a government entity (e.g., municipality). The warning, the notification, the alarm, and/or the alert is preferably provided automatically to the vehicle, the person, the emergency responder, the maintenance worker, and/or the government entity. In one embodiment, the warning, the notification, the alarm, and/or the alert is provided to at least one vehicle due to an event and/or a state. The event and/or the state includes, but is not limited to, a roadway, an animal or a person on a roadway, a traffic jam, an accident, an object in the roadway (e.g., downed power line, branch), an emergency, adverse weather conditions (e.g., excessive sunlight, snow, ice, rain, wind, tornado, hail, etc.), and/or a defect in the roadway (e.g., pothole). In one example, the warning, the notification, the alarm, and/or the alert is provided to emergency services that an event (e.g., an accident) has occurred. The warning, the notification, the alarm, and/or the alert is preferably provided with enough time for the vehicle, the person, the emergency responder, the maintenance worker, and/or the government entity to adequately respond. In one example, the warning, the notification, the alarm, and/or the alert is provided with enough time for a driver of the vehicle to stop based on a speed of the vehicle. For example, if a vehicle is going 70 miles per hour, the vehicle takes approximately 315 feet to stop (e.g., reaction time plus braking time). In another example, the warning, the notification, the alarm, and/or the alert is provided to a government entity to fix a roadway (e.g., pothole).

In another embodiment, the intelligent transportation system is operable to provide a warning, a notification, an alarm, and/or an alert due to a vehicle traveling in an unsafe manner. For example, the warning, the notification, the alarm, and/or the alert is provided to emergency services, drivers, and/or other vehicles that a vehicle is travelling north on a southbound lane. In another example, the warning, the notification, the alarm, and/or the alert is provided to emergency services, drivers, and/or other vehicles that a vehicle is travelling at a high rate of speed. In yet another example, the warning, the notification, the alarm, and/or the alert is provided to emergency services, drivers, and/or other vehicles that a vehicle is not driving in a straight path and/or within a lane (e.g., swerving).

In one embodiment, the intelligent transportation system is operable to control an autonomous vehicle and/or an unmanned vehicle based on the warning, the notification, the alarm, and/or the alert. In one embodiment, the warning, the notification, the alarm, and/or the alert is provided to the autonomous vehicle and/or the unmanned vehicle to change a speed, a direction, a route, an orientation, and/or an elevation. The autonomous vehicle is partially autonomous or fully autonomous. In one example, the autonomous vehicle changes lanes to allow an emergency vehicle to pass.

In one embodiment, the intelligent transportation system is operable to provide a warning, a notification, an alarm, and/or an alert due to a malfunction (e.g., impending, current) and/or an obstruction of at least one sensor. For example, the warning, the notification, the alarm, and/or the alert is provided if a camera view is obstructed. In another example, the warning, the notification, the alarm, and/or the alert is provided to replace a power supply (e.g., battery) for at least one sensor.

In one embodiment, the intelligent transportation system is operable to check for violations of traffic rules. In one embodiment, the intelligent transportation system is operable to determine a speed of a vehicle, capture license plate information, detect a number of occupants in the vehicle, capture images of the occupants of the vehicle (e.g., driver), monitor lane usage by the vehicle, and/or provide traffic citations. For example, the intelligent transportation system is operable to determine that a speed of a vehicle exceeds a speed limit, capture license plate information of the vehicle, capture an image of a driver of the vehicle, and issue a citation for excessive speed to the driver. Further, the intelligent transportation system is operable to record information related to potential witnesses (e.g., nearby drivers, pedestrians) including, but not limited to, an identity, a location, a timestamp, and/or an image. In one embodiment, the intelligent transportation system is operable to identify and/or communicate with the potential witnesses via user devices belonging to the potential witnesses. In one embodiment, the intelligent transportation system is operable to detect a violation of a traffic rule and dispatch traffic enforcement (e.g., police) to respond to the violation.

In one embodiment, the intelligent transportation system is utilized to provide parking management. In one embodiment, the intelligent transportation system is used to identify open parking spaces. In one embodiment, the identification of the open parking spaces is using at least one sensor (e.g., an object sensor, a location sensor). In another embodiment, the intelligent transportation system is operable hold and/or reserve an open parking space. In yet another embodiment, the intelligent transportation system is operable to process payment for a parking space. For example, the payment is based on a time the parking space was occupied. In still another embodiment, the intelligent transportation system is utilized to provide parking enforcement. For example, the intelligent transportation system is operable to identify a vehicle not parked within the lines, a vehicle parked in an expired spot, etc.

In one embodiment, the present invention includes at least one vehicular network. In one embodiment, the present invention is operable to create at least one private network (e.g., at least one private cellular network) and/or at least one public network (e.g., at least one public cellular network) for the intelligent transportation system. For example, the node of the intelligent transportation system is operable to create at least one network. In one embodiment, vehicles and/or user devices access a public network while infrastructure (e.g., traffic devices and signage) accesses a private network. Advantageously, segregating devices on a public network and a private network increases security for the system as a whole and improves the likelihood that the private network remains private.

The edge computing platform is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The edge computing platform is operable to use any of the aforementioned learning techniques alone or in combination.

Further, the edge computing platform is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The edge computing platform is preferably operable to recommend and/or perform actions based on historical data, external data sources, ML, AI, NNs, and/or other learning techniques. The edge computing platform is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

Location data is created in the present invention using one or more hardware and/or software components. By way of example and not limitation, location data is created using the Global Positioning System (GPS), low energy BLUETOOTH based systems such as beacons, wireless networks such as W-IFI, Radio Frequency (RF) including RF Identification (RFID), Near Field Communication (NFC), magnetic positioning, and/or cellular triangulation. By way of example, location data is determined via an Internet Protocol (IP) address of a device connected to a wireless network. A wireless router is also operable to determine identities of devices connected to the wireless network through the router, and thus is operable to determine the locations of these devices through their presence in the connection range of the wireless router.

Figure 8:
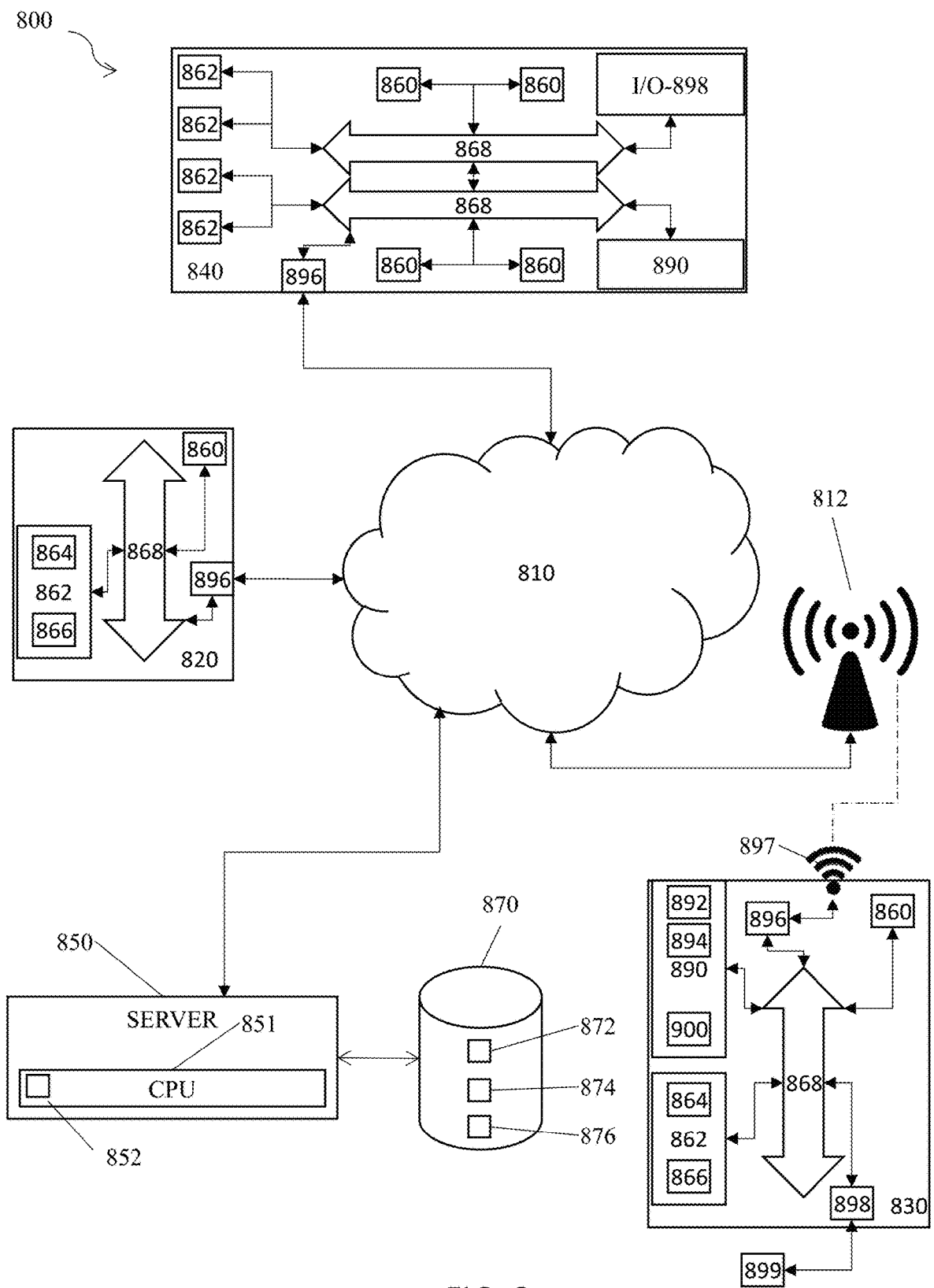
FIG. 8 is a schematic diagram of a system of the present invention.

FIG. 8 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus

868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 8, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 8, is operable to include other components that are not explicitly shown in FIG. 8, or is operable to utilize an architecture completely different than that shown in FIG. 8. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A system for providing multi-access edge computing and content delivery, comprising:

at least one cloud platform in network communication with at least one edge device; and at least one server node;

wherein the at least one cloud platform includes a cloud platform domain name system (DNS) service, an edge DNS service, at least one cloud platform application programming interface (API), at least one cloud platform router, a cloud platform database, and a node database;

wherein the at least one cloud platform is in network communication with the at least one server node;

wherein the at least one cloud platform is operable to fetch node data from the at least one server node;

wherein the at least one cloud platform is operable to receive a hypertext transfer protocol (HTTP) request from the at least one edge device;

wherein the at least one cloud platform is operable to execute the HTTP request using the at least one server node;

wherein the at least one server node is operable to create at least one network;

wherein the at least one server node is operable to deliver network services to the at least one edge device through the at least one network; and wherein the at least one server node is registered in a cloud platform global registry using an HTTP POST request to a global service address and wherein the cloud platform global registry is associated with the at least one cloud platform.

2. The system of claim 1, wherein the at least one server node includes a node identifier (ID), an internet protocol (IP) address, a set of global positioning system (GPS) coordinates, a central processing unit (CPU) ID, a version number, an uptime value, a node heartbeat value, an edge executor, a plurality of v8 isolates, and/or time zone data.

3. The system of claim 1, wherein the at least one cloud platform is operable to fetch node data from the at least one server node using an object-oriented function and wherein the object-oriented function is a serverless function.

4. The system of claim 1, wherein the at least one server node includes a radio network node.

5. The system of claim 1, wherein the at least one server node is operable to perform at least one evolved packet core (EPC) function.

6. The system of claim 1, wherein the at least one network is a vehicular network.

7. The system of claim 1, wherein the at least one edge device includes at least one vehicle.

8. The system of claim 1, wherein the at least one edge device includes at least one sensor, wherein the at least one sensor includes a motion sensor, an acceleration sensor, an electromagnetic sensor, a location sensor, a sound sensor, a camera, a temperature sensor, a humidity sensor, an object sensor, an air pressure sensor, a precipitation sensor, an anemometer, a light sensor, an air quality sensor, a chemical sensor, an ammeter, a voltmeter, a power meter, a magnetic field sensor, an orientation sensor, and/or an acceleration sensor.

9. The system of claim 1, wherein the at least one server node is operable to implement at least one access policy.

10. The system of claim 1, wherein the at least one cloud platform is operable to implement quality of service (QOS) mechanisms on the at least one network.

* * * * *